US011008794B2

(12) United States Patent
Chen

(10) Patent No.: US 11,008,794 B2
(45) Date of Patent: May 18, 2021

(54) DAMPER DEVICE AND HINGE ASSEMBLY INCLUDING THE SAME

(71) Applicant: Waterson Chen, Taichung (TW)

(72) Inventor: Waterson Chen, Taichung (TW)

( * ) Notice: Subject to any disclaimer, the term of this patent is extended or adjusted under 35 U.S.C. 154(b) by 0 days.

(21) Appl. No.: 16/660,494

(22) Filed: Oct. 22, 2019

(65) Prior Publication Data

US 2020/0378168 A1 Dec. 3, 2020

(30) Foreign Application Priority Data

May 27, 2019 (TW) ................................ 108118240

(51) Int. Cl.
*E05F 3/22* (2006.01)
*E05F 3/20* (2006.01)
(Continued)

(52) U.S. Cl.
CPC ................. *E05F 3/20* (2013.01); *E05D 3/02* (2013.01); *E05D 11/087* (2013.01); *E05F 3/08* (2013.01);
(Continued)

(58) Field of Classification Search
CPC . Y10T 16/283; Y10T 16/304; Y10T 16/2771; Y10T 16/5387; Y10T 16/537; Y10T 16/5373; Y10T 16/53888; Y10T 16/2766; Y10T 16/02771; Y10T 16/04; Y10T 16/08; Y10T 16/10; Y10T 16/12; E05F 1/066; E05F 1/1008; E05F 1/12; E05F 1/1207; E05F 1/1223; E05F 3/00; E05F 3/04; E05F 3/08; E05F 3/10; E05F 3/12; E05F 3/20; E05D 7/12; E05D 2005/108; E05D 2003/027; E05Y 2800/00; E05Y 2201/2126; E05Y 2201/264; E05Y 2201/266; E05Y 2201/408;
(Continued)

(56) References Cited

U.S. PATENT DOCUMENTS 1,824,217 A * 9/1931 Kreiner .................... E05F 3/20 16/54
2,118,950 A * 5/1938 Stannard .................. E05F 3/20 16/54
(Continued)

FOREIGN PATENT DOCUMENTS

EP 2233775 A1 * 9/2010 .............. F16F 9/512
GB 613960 A * 12/1948 ........... F16F 9/3214
(Continued)

*Primary Examiner* — Chuck Y Mah

(74) *Attorney, Agent, or Firm* — Lewis Roca Rothgerber Christie LLP

(57) ABSTRACT

A damper device includes an outer cylinder, an inner cylinder disposed inside the outer cylinder and having an inner chamber, a lower open end, and an upper closed end wall with a vent hole, a piston disposed in the inner chamber and having a passageway, a check valve coupled to the passageway to permit only upward flowing of a working fluid in the inner chamber through the passageway, and a piston rod having a lower rod end disposed outwardly of the outer cylinder, and an upper rod mounted to permit the piston to slide with the piston rod. The sliding of the piston rod is dampened by sliding of the piston in the inner chamber. A hinge assembly including the damper device is also disclosed.

19 Claims, 18 Drawing Sheets

(51) Int. Cl.

| | |
|---|---|
| ***F16F 9/34*** | (2006.01) |
| ***F16F 9/32*** | (2006.01) |
| ***F16F 9/36*** | (2006.01) |
| ***E05D 3/02*** | (2006.01) |
| ***F16H 25/12*** | (2006.01) |
| ***F16F 13/00*** | (2006.01) |
| ***F16F 9/56*** | (2006.01) |
| ***F16F 9/44*** | (2006.01) |
| ***E05F 3/12*** | (2006.01) |
| ***E05D 11/08*** | (2006.01) |
| ***E05F 3/08*** | (2006.01) |
| ***F16K 15/02*** | (2006.01) |
| ***F16F 9/18*** | (2006.01) |

(52) U.S. Cl.
CPC ................ *E05F 3/12* (2013.01); *F16F 9/187* (2013.01); *F16F 9/325* (2013.01); *F16F 9/3242* (2013.01); *F16F 9/34* (2013.01); *F16F 9/369* (2013.01); *F16F 9/44* (2013.01); *F16F 9/56* (2013.01); *F16F 13/007* (2013.01); *F16H 25/125* (2013.01); *F16K 15/026* (2013.01); *E05D 2003/027* (2013.01); *E05Y 2201/212* (2013.01); *E05Y 2201/218* (2013.01); *E05Y 2201/26* (2013.01); *E05Y 2201/266* (2013.01); *E05Y 2201/484* (2013.01); *E05Y 2900/132* (2013.01); *F16F 2222/12* (2013.01); *F16F 2228/066* (2013.01); *F16F 2232/02* (2013.01); *F16F 2232/04* (2013.01); *F16F 2232/08* (2013.01)

(58) Field of Classification Search
CPC ......... E05Y 2201/456; E05Y 2201/484; E05Y 2201/696; E05Y 2201/628; E05Y 2201/638; E05Y 2201/212; E05Y 2201/218; E05Y 2201/256; E05Y 2900/40; E05Y 2900/132; F16F 9/187; F16F 9/3242; F16F 9/325; F16F 9/34; F16F 9/369; F16F 9/44; F16F 9/56; F16F 13/007; F16F 2222/12; F16F 2228/066; F16F 2232/02; F16F 2232/04; F16F 2232/08; F16H 25/125; F16K 15/026
See application file for complete search history.

(56) References Cited

U.S. PATENT DOCUMENTS

| | | | | | |
|---|---|---|---|---|---|
| 4,358,870 | A | * | 11/1982 | Hong | E05F 3/20 16/53 |
| 4,413,373 | A | * | 11/1983 | Sasaki | E05F 3/08 16/54 |
| 5,855,040 | A | * | 1/1999 | Lin | E05D 5/10 16/50 |
| 6,205,619 | B1 | * | 3/2001 | Jang | E05D 5/10 16/352 |
| 6,851,528 | B2 | * | 2/2005 | Lemieux | F16F 9/44 188/266.6 |
| 6,854,161 | B2 | * | 2/2005 | Lee | E05F 1/1223 16/50 |
| 8,875,345 | B2 | * | 11/2014 | Miglioranzo | E05F 3/12 16/54 |
| 9,617,772 | B1 | | 4/2017 | Chen | |
| 9,926,732 | B2 | * | 3/2018 | Bacchetti | E05F 3/20 |
| 2009/0241289 | A1 | * | 10/2009 | Choi | E05F 3/20 16/275 |
| 2011/0095460 | A1 | * | 4/2011 | Maffeis | F16F 9/486 267/140.13 |
| 2016/0025176 | A1 | * | 1/2016 | Kamakura | F16K 31/0693 137/487.5 |
| 2016/0263960 | A1 | * | 9/2016 | Teraoka | F16F 9/50 |
| 2017/0241180 | A1 | * | 8/2017 | Bacchetti | E05D 3/02 |
| 2017/0350466 | A1 | * | 12/2017 | Bohrer | F16F 9/062 |
| 2018/0238092 | A1 | * | 8/2018 | Feng | E05F 3/14 |
| 2018/0340588 | A1 | * | 11/2018 | Chikamatsu | B60G 17/08 |
| 2019/0136932 | A1 | * | 5/2019 | Deferme | F16F 9/185 |
| 2019/0330903 | A1 | * | 10/2019 | Talpe | E05F 1/1207 |
| 2020/0141467 | A1 | * | 5/2020 | Mohammadi | B21D 22/28 |

FOREIGN PATENT DOCUMENTS

| | | | | | |
|---|---|---|---|---|---|
| GB | 1314103 | A | * | 4/1973 | F16F 9/512 |
| GB | 2373307 | A | * | 9/2002 | F16F 9/348 |
| TW | I580856 | | | 5/2017 | |

* cited by examiner

DAMPER DEVICE AND HINGE ASSEMBLY INCLUDING THE SAME

CROSS-REFERENCE TO RELATED APPLICATION

This application claims priority from Taiwanese invention patent application no. 108118240, filed on May 27, 2019.

FIELD

The disclosure relates to a damper device, more particularly to a hinge assembly including a damper device.

BACKGROUND

Taiwanese patent No. 1580856, corresponding to counterpart U.S. Pat. No. 9,617,772 B1, discloses a conventional hinge assemblage includes a leaf mechanism, an actuating unit and a damping unit. The leaf mechanism includes a first leaf and a second leaf pivotable relative to the first leaf such that the hinge assemblage is convertible between first and second states. The actuating unit is mounted to the leaf mechanism, and generates an actuating force during the conversion of the hinge assemblage. The damping unit is mounted to the leaf mechanism for generating a damping force. The damping force generated by the damping unit during the conversion of the hinge assemblage toward the first state is different from the damping force generated by the damping unit during the conversion of the hinge assemblage toward the second state.

SUMMARY

A first object of the disclosure is to provide a novel damper device with a simplified structure, and a second object of the disclosure is to provide a hinge assembly which includes the novel damper device, and which can be easily assembled.

According to a first aspect of the disclosure, a damper device includes an outer cylinder, an inner cylinder, a piston, a check valve, and a piston rod. The outer cylinder extends along a longitudinal axis. The inner cylinder is disposed inside the outer cylinder to define a clearance between the inner and outer cylinders, and defines therein an inner chamber for accommodation of a working fluid. The inner cylinder has a lower open end and an upper closed end wall formed with a vent hole. The piston is disposed in the inner chamber to divide the inner chamber into an upper sub-chamber, which is in fluid communication with the clearance through the vent hole, and a lower sub-chamber, which is in fluid communication with the clearance through the lower open end. The piston has a passageway for fluid communication between the upper and lower sub-chambers, and is slidable between a distal position and a proximate position relative to the upper closed end wall. The check valve is coupled to the passageway in a manner to permit a unidirectional flow of the working fluid from the lower sub-chamber to the upper sub-chamber such that when the piston slides toward the distal position, the working fluid is permitted to flow from the lower sub-chamber to the upper sub-chamber through the passageway, and such that when the piston slides toward the proximate position, the working fluid in the upper sub-chamber is forced to flow to the lower sub-chamber through the vent hole, the clearance, and the lower open end. The piston rod has a lower rod end which is disposed outwardly of the outer cylinder, and an upper rod end which is mounted to the piston to permit the piston to slide with the piston rod such that sliding of the piston rod is dampened by sliding of the piston in the inner chamber.

According to a second aspect of the disclosure, a hinge assembly for hingedly connecting a first element to a second element includes the damper device, a first hinge plate, a second hinge plate, a first tube, a guiding stem, an internal mount, and a slidable shaft. The first hinge plate includes a first leaf portion for being mounted to the first element, and a first barrel portion. The second hinge plate includes a second leaf portion for being mounted to the second element, and a second barrel portion which has an upper barrel segment, a lower barrel segment, and a middle barrel segment between the upper and lower barrel segments, and which is disposed beneath and coupled to the first barrel portion such that the first hinge plate is turnable relative to the second hinge plate between a first position, where the first and second leaf portions defines therebetween a first included angle, and a second position, where the first and second leaf portions defines therebetween a second included angle smaller than the first included angle. The first tube extends along the longitudinal axis, and includes a first upper segment and a second lower segment. The first upper segment is fitted inside the first barrel portion to permit the first tube to turn with the first barrel portion about the longitudinal axis, and is configured to permit the damper device to be coupled therein to turn with the first tube. The first lower segment is disposed inside the upper barrel segment of the second barrel portion to permit the first tube to turn about the longitudinal axis relative to the second barrel portion. The guiding stem is fitted inside the first lower segment to turn with the first tube, and has a central bore extending along the longitudinal axis. The guiding stem has a top camming region. The internal mount is non-rotatably mounted inside the middle barrel segment of the second barrel portion, and has a limiting hole extending along the longitudinal axis. The slidable shaft extends along the longitudinal axis and includes a shaft body and an enlarged head. The shaft body has an upper end segment and a lower end segment, and extends through the central bore to be fitted in the limiting hole so as to prevent the slidable shaft from rotating relative to the internal mount and so as to permit the slidable shaft to slide relative to the internal mount and the guiding stem along the longitudinal axis. The enlarged head is fixed on the upper end segment of the shaft body to permit the shaft body to slide with the enlarged head, and is disposed inside the first lower segment of the first tube to be coupled between the guiding stem and the lower rod end of the piston rod. The enlarged head has a bottom follower region which is engaged by the top camming region such that in response to turning of the first hinge plate from the first position to the second position to cause the guiding stem to turn relative to the enlarged head, by virtue of camming action between the top camming region and the bottom follower region, the enlarged head is elevated by the guiding stem from a lower position to an upper position, resulting in sliding of the piston from the distal position to the proximate position, to thereby permit the damper device to dampen the turning of the first hinge plate.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
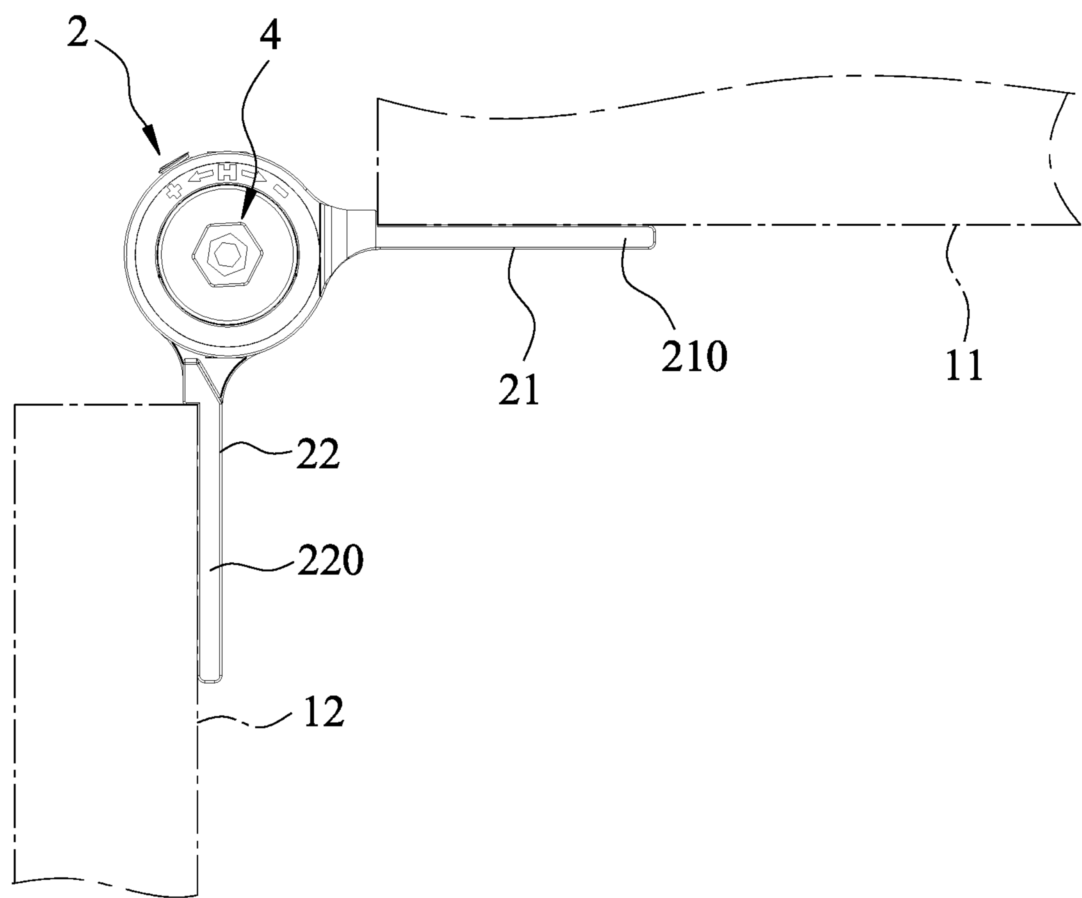
FIG. 1 is a top view of a hinge assembly according to a first embodiment of the disclosure illustrating a first hinge plate in a first position.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 2:
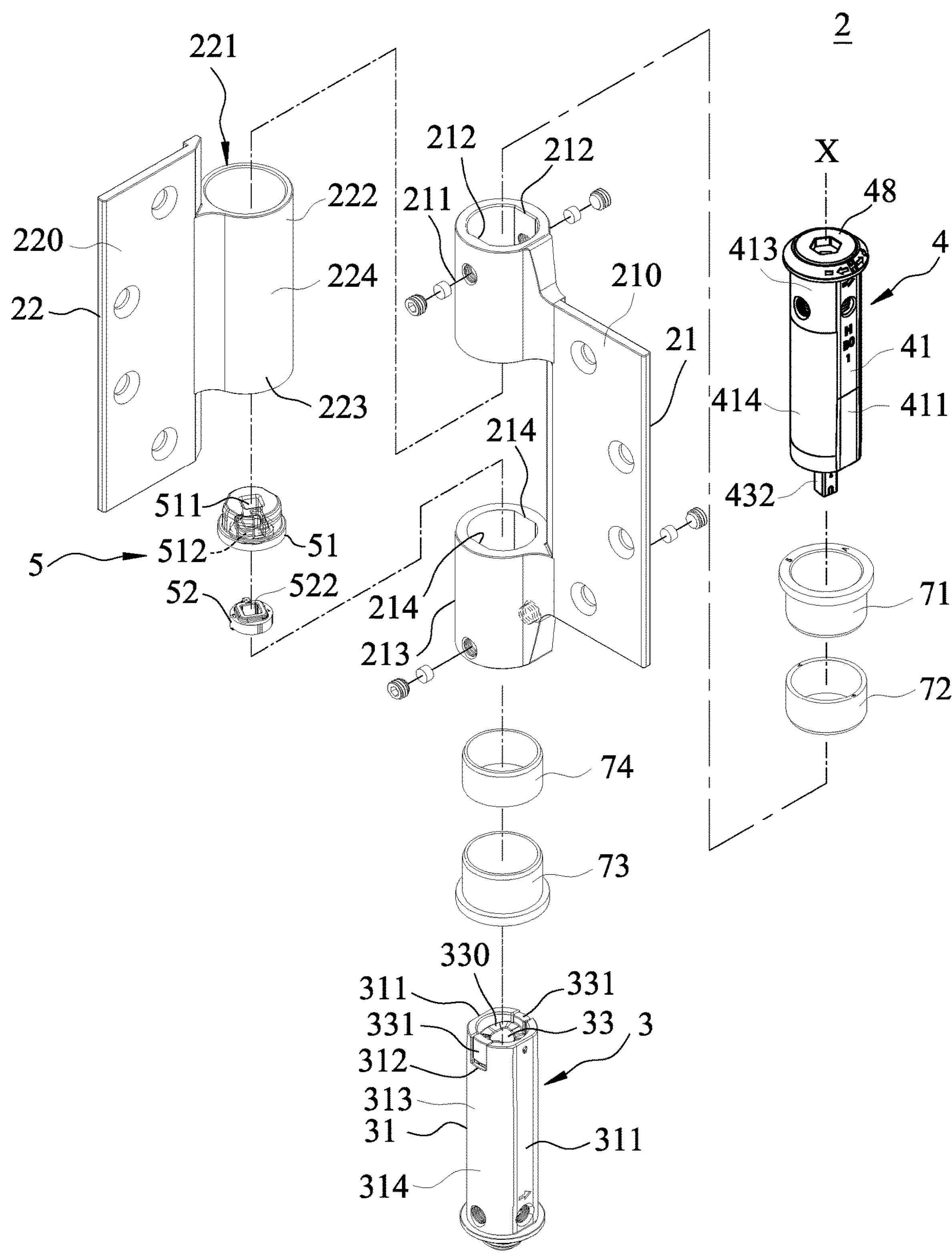
FIG. 2 is a partially exploded perspective view of the hinge assembly of FIG. 1.
Figure 5:
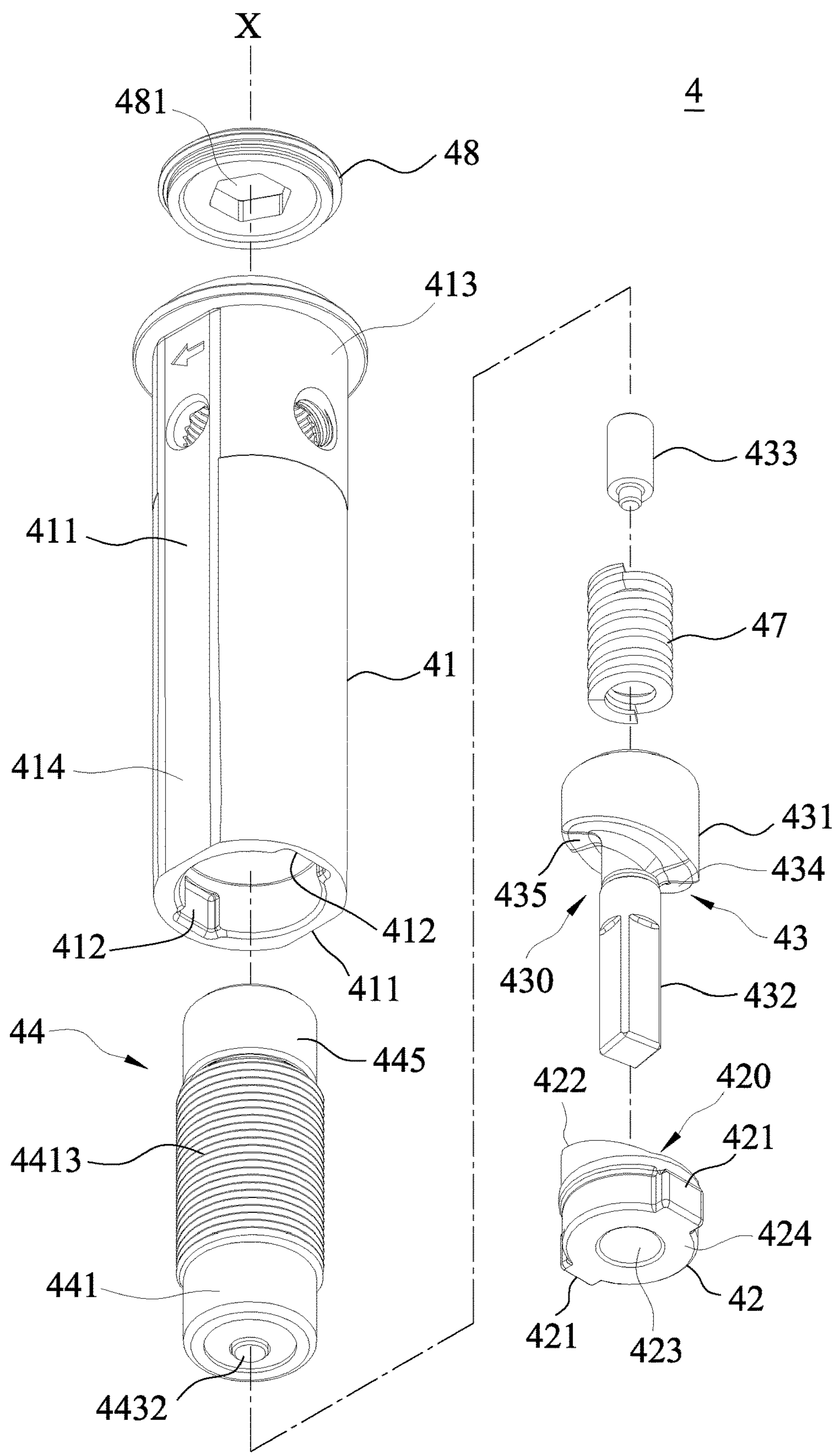
FIG. 5 is a partially exploded perspective view of an upper tube subassembly of the hinge assembly of FIG. 1.

Referring to FIGS. 1, 2, and 5, a hinge assembly 2 according to a first embodiment of the disclosure is used for hingedly connecting a first element 11 to a second element, and is shown to include a first hinge plate 21, a second hinge plate 22, an upper tube subassembly 4, and an internal unit 5. The upper tube subassembly 4 includes a first tube 41, a guiding stem 42, a slidable shaft 43, and a damper device 44. The internal unit 5 includes an internal mount 51.

As shown in FIG. 2, the first hinge plate 21 includes a first leaf portion 210, and a first barrel portion 211. The first leaf portion 210 is disposed for being mounted to the first element 11.

Figure 11:
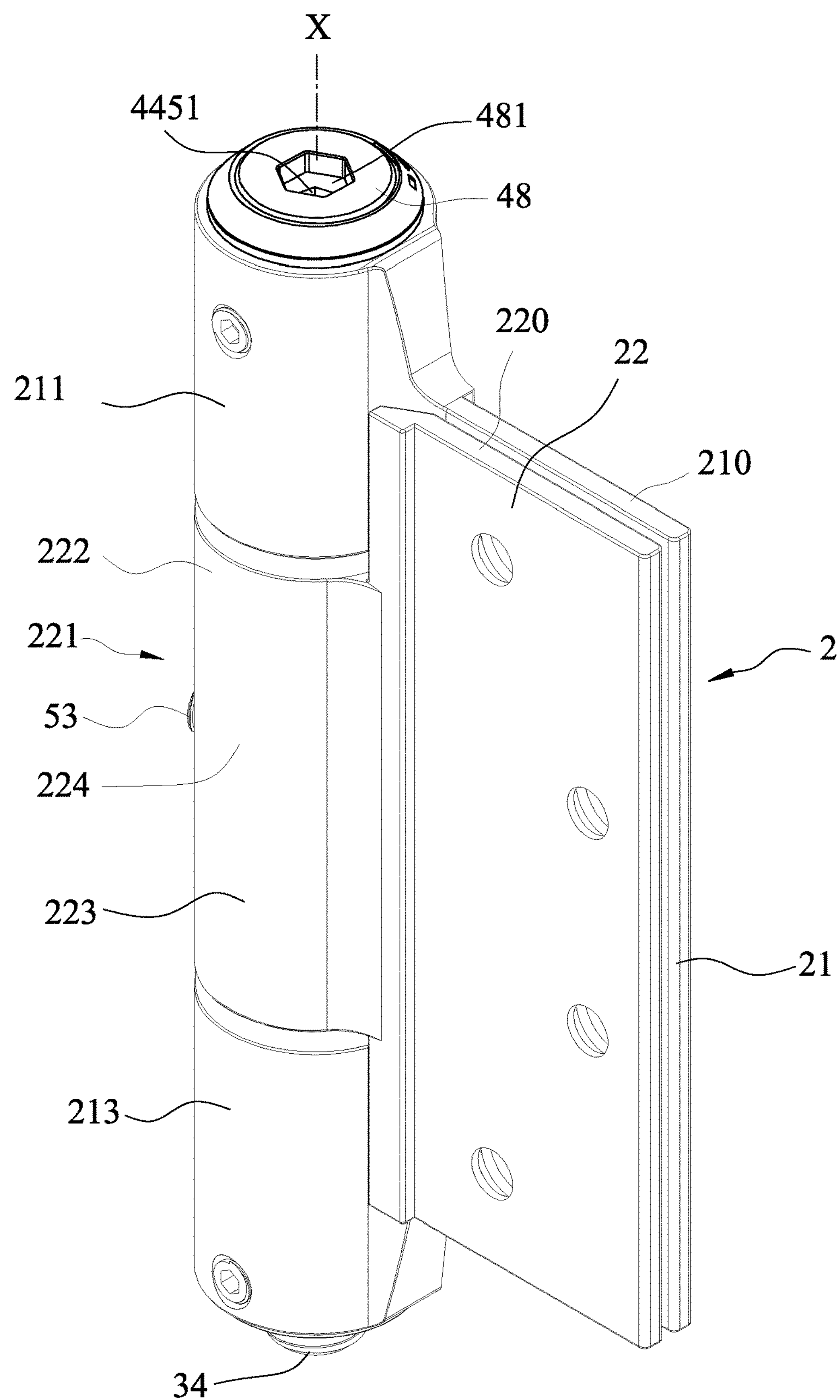
FIG. 11 is a perspective view of the hinge assembly illustrating the first hinge plate in a second position.

The second hinge plate 22 includes a second leaf portion 220 and a second barrel portion 221. The second leaf portion 220 is disposed for being mounted to the second element 12. The second barrel portion 221 has an upper barrel segment 222, a lower barrel segment 223, and a middle barrel segment 224 between the upper and lower barrel segments 222, 223. The second barrel portion 221 is disposed beneath and coupled to the first barrel portion 211. When one of the first and second hinge plates 21, 22 is subjected to an external force, the first hinge plate 21 is turnable relative to the second hinge plate 22 about a longitudinal axis (X) between a first position and a second position. In the first position, as shown in FIG. 1, the first and second leaf portions 210, 220 defines therebetween a first included angle. In the second position, as shown in FIG. 11, the first and second leaf portions 210, 220 defines therebetween a second included angle smaller than the first included angle. In an embodiment, each of the first and second hinge plates 21, 22 is made of a metal material.

Figure 12:
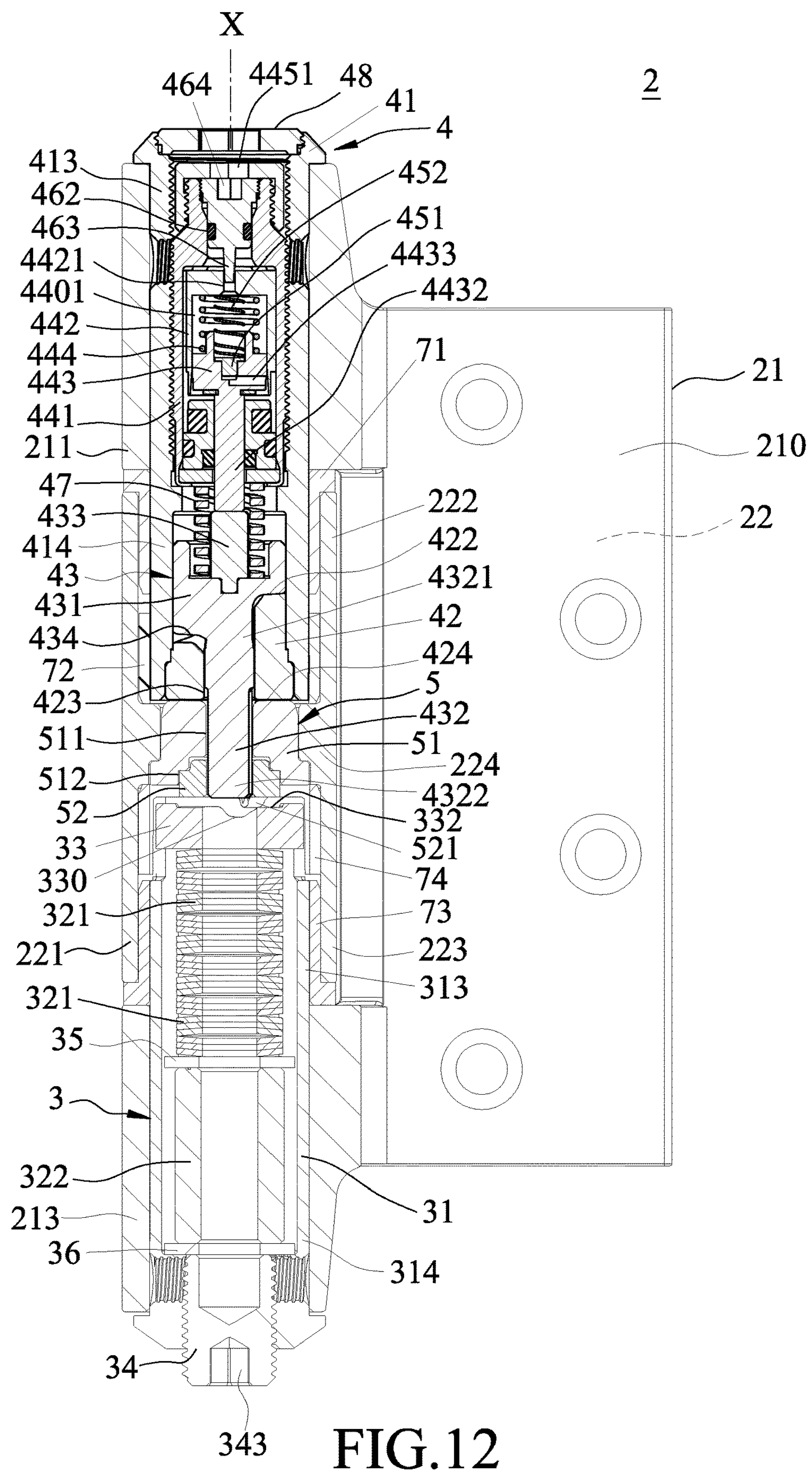
FIG. 12 is a cross-sectional view of the hinge assembly of the first embodiment.

In an embodiment shown in FIGS. 2 and 12, the first hinge plate 21 may further include a third barrel portion 213. The first and third barrel portions 211, 213 are coupled to two opposite sides of the second barrel portion 221 to turn relative to the second barrel portion 221 about the longitudinal axis (X).

In an embodiment, the first element 11 may be a door, and the second element 12 may be a door frame. The first hinge plate 21 may be mounted to turn with the door 11, and the second hinge plate 22 may be non-turnably mounted to the door frame 12. In other embodiment, the second hinge plate 22 may be mounted to turn with the door 11, and the first hinge plate 21 may be non-turnably mounted to the door frame 12. When the door 11 is in an opened position, an included angle between the door 11 and the door frame 12 is greater than 0° and may be less than 200°, and the first hinge plate 21 may be in the first position. When the door 11 is in a closed position, an included angle between the door 11 and the door frame 12 is 0°, and the first hinge plate 21 may be in the second position.

Figure 6:
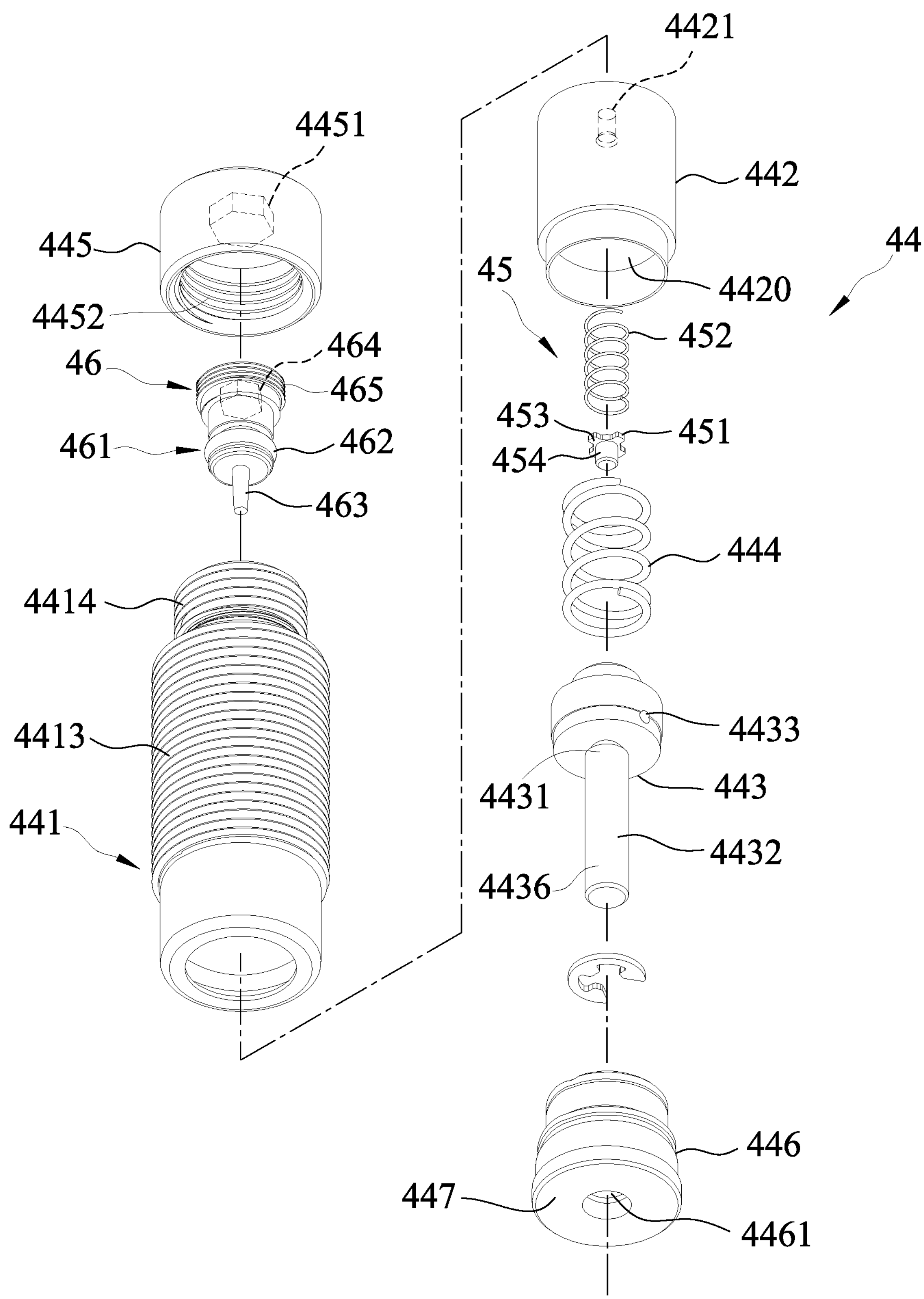
FIG. 6 is an exploded perspective view of a damper device in the upper tube subassembly.
Figure 7:
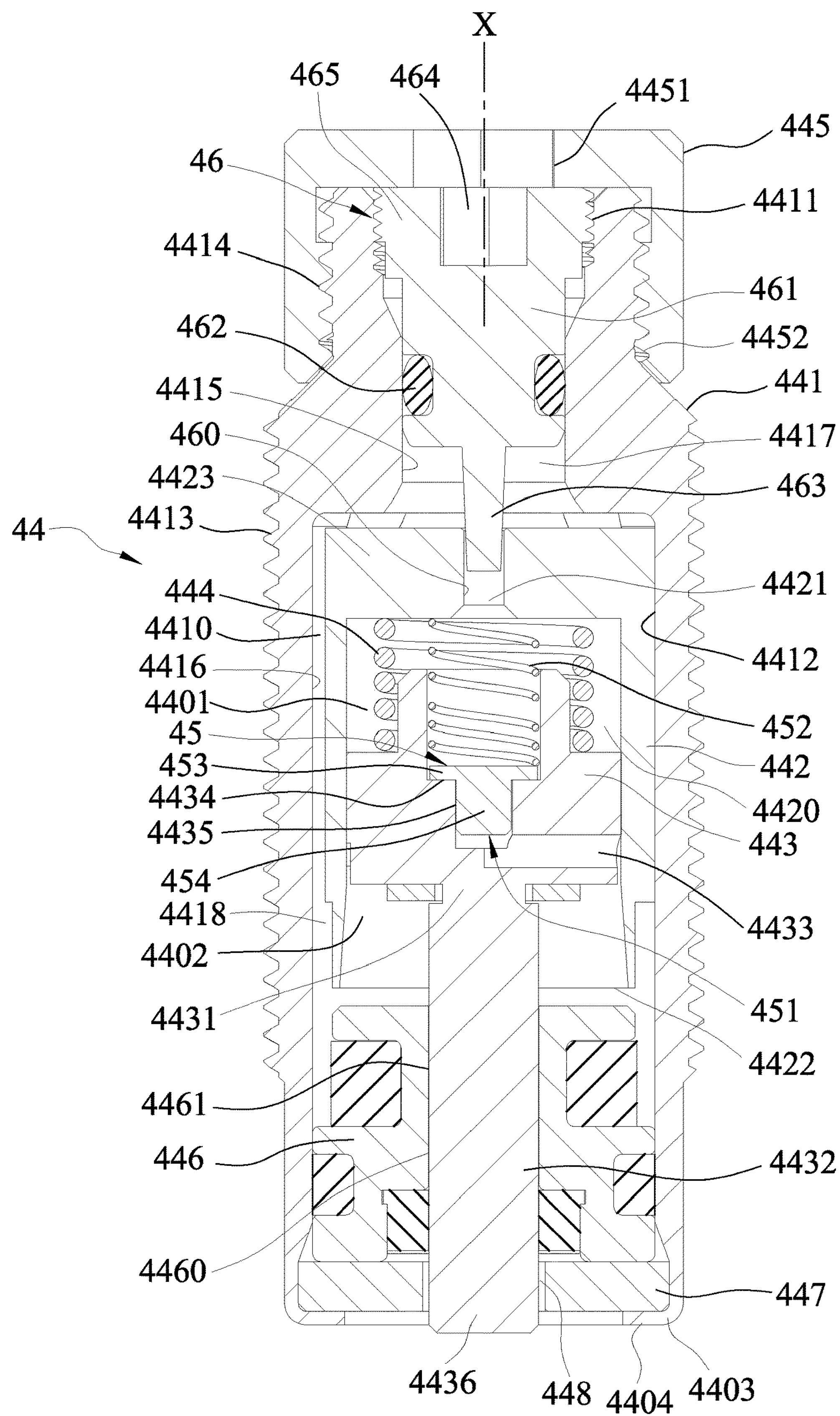
FIG. 7 is a cross-sectional view of the damper device illustrating a piston in a proximate position.
Figure 8:
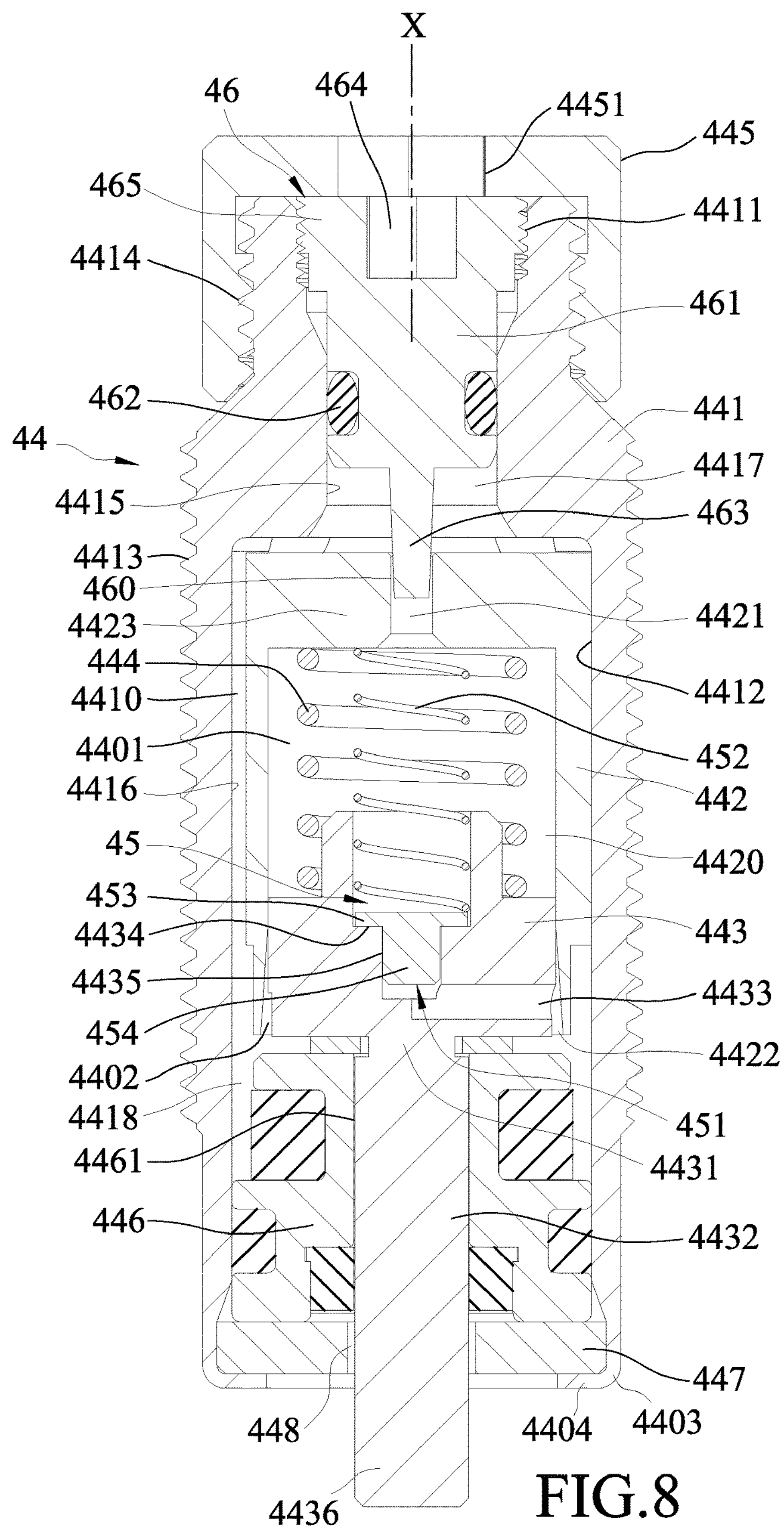
FIG. 8 is similar to FIG. 7 but illustrating the piston in a distal position.

As shown in FIGS. 6 to 8, the damper device 44 includes an outer cylinder 441, an inner cylinder 442, a piston 443, a check valve 45, and a piston rod 4432.

The outer cylinder 441 extends along the longitudinal axis (X).

In an embodiment shown in FIGS. 6 and 7, an outer peripheral surface of the outer cylinder 441 has a large dimension segment formed with a male threaded region 4413, and a small dimension segment formed with a male threaded region 4414.

In an embodiment shown in FIGS. 7 and 8, the outer cylinder 441 has an inner peripheral surface 4412 including a first upper dimension segment 4415 and a first lower dimension segment 4416. The first upper dimension segment 4415 defines an upper space 4417, and has a female threaded region 4411. The first lower dimension segment 4416 is larger than the first upper dimension segment 4415, and defines a lower space 4418.

The inner cylinder 442 is disposed inside the outer cylinder 441 to define a clearance 4410 between the inner and outer cylinders 441, 442, and defines therein an inner chamber 4420 for accommodation of a working fluid. The inner cylinder 442 has a lower open end 4422 and an upper closed end wall 4423 formed with a vent hole 4421. The working fluid may be a hydraulic oil. In an embodiment shown in FIGS. 7 and 8, the inner cylinder 442 is accommodated in the lower space 4418 of the outer cylinder 441.

The piston 443 is disposed in the inner chamber 4420 to divide the inner chamber 4420 into an upper sub-chamber 4401 and a lower sub-chamber 4402. The upper sub-chamber 4401 is in fluid communication with the clearance 4410 through the vent hole 4421. The lower sub-chamber 4402 is in fluid communication with the clearance 4410 through the lower open end 4422. The piston 443 has a passageway 4433 for fluid communication between the upper and lower sub-chambers 4401, 4402, and is slidable between a distal position (FIG. 8) and a proximate position (FIG. 7) relative to the upper closed end wall 4423.

The check valve 45 is coupled to the passageway 4433 in a manner to permit a unidirectional flow of the working fluid from the lower sub-chamber 4402 to the upper sub-chamber 4401 such that when the piston 443 slides toward the distal position (FIG. 8), the working fluid is permitted to flow from the lower sub-chamber 4402 to the upper sub-chamber 4401 through the passageway 4433, and such that when the piston 443 slides toward the proximate position (FIG. 7), the working fluid in the upper sub-chamber 4401 is forced to flow to the lower sub-chamber 4402 through the vent hole 4421, the clearance 4410, and the lower open end 4422.

In an embodiment shown in FIG. 7, the check valve 45 includes a valve body 451, a valve seat 4434, and a first biasing spring 452. The valve seat 4434 is formed on an upper side of the piston 443, and defines a valve hole 4435 in fluid communication with the passageway 4433. The valve seat 4434 has a contour corresponding to a shape of the valve body 451. The first biasing spring 452 is disposed between the valve body 451 and the upper closed end wall 4423 to bias the valve body 451 to couple on the valve seat 4434 so as to ensure the unidirectional flow of the working fluid from the lower sub-chamber 4402 to the upper sub-chamber 4401.

In an embodiment shown in FIG. 7, the valve body 451 has a stem portion 454 for insertion into the valve hole 4435, and a flange portion 453 extending radially from an upper end of the stem portion 454 for resting on the valve seat 4434.

Figure 13:
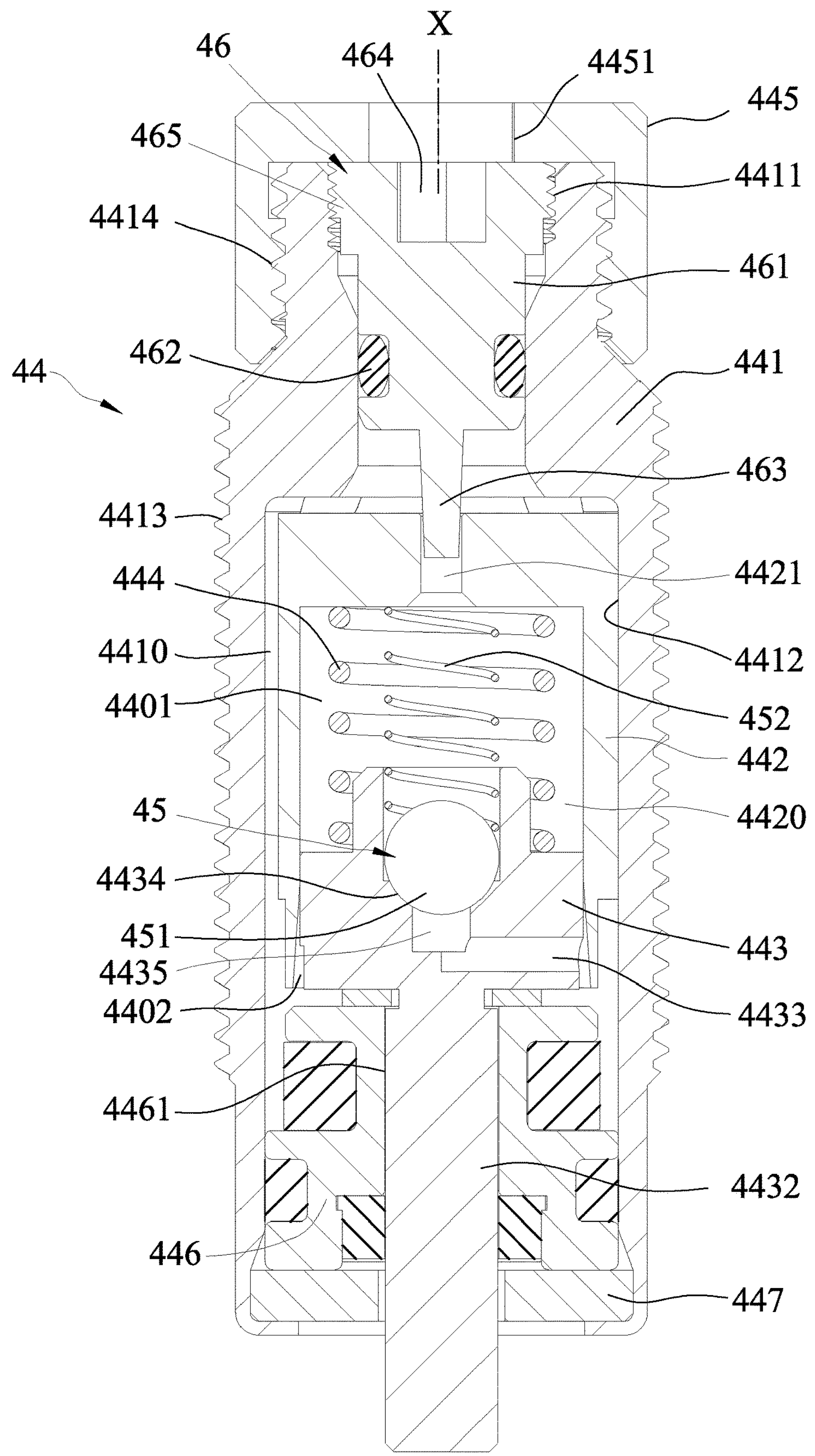
FIG. 13 is a cross-sectional view illustrating a modified embodiment of the damper device.
Figure 14:
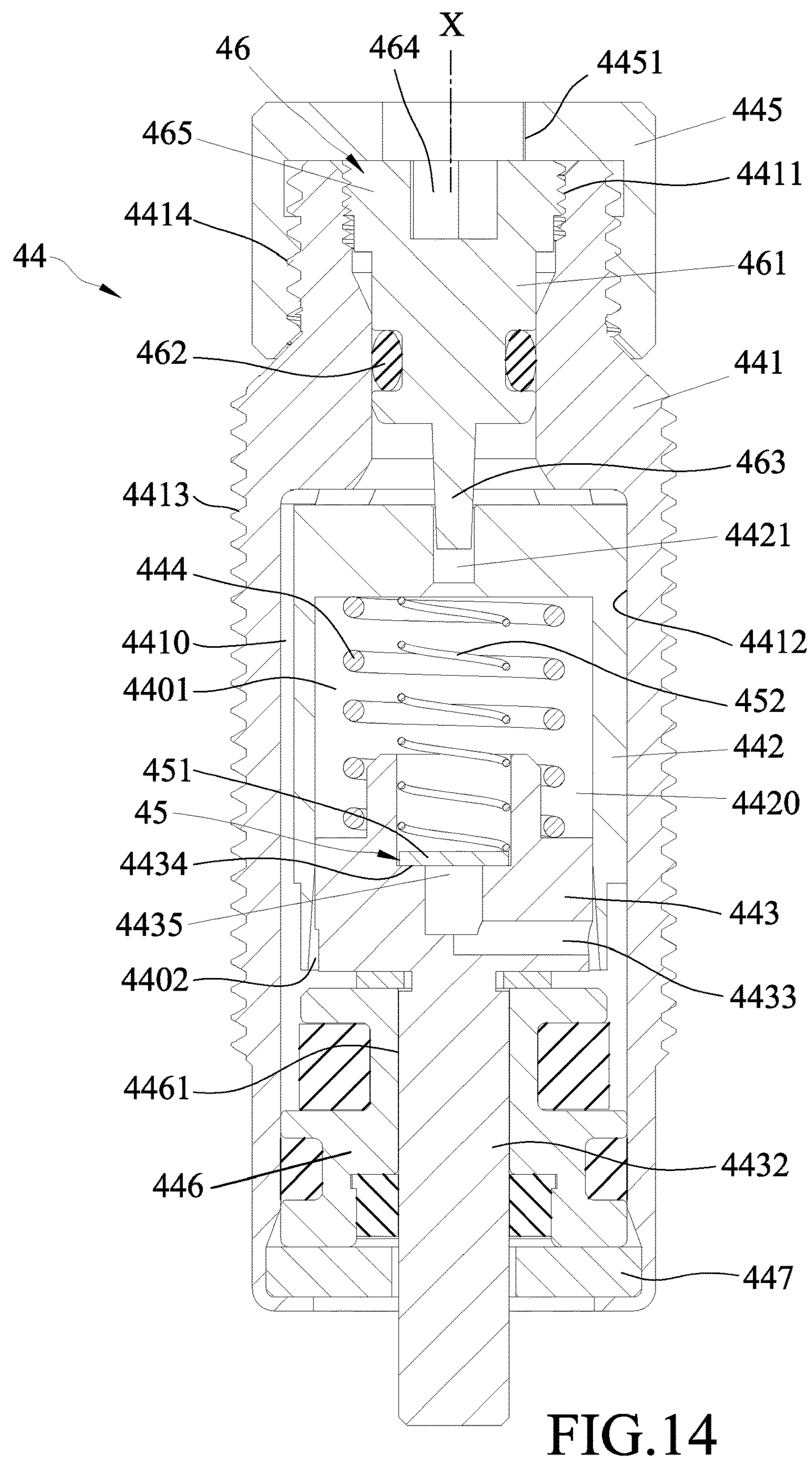
FIG. 14 is a cross-sectional view illustrating another modified embodiment of the damper device.

In a modified embodiment shown in FIG. 13, the valve body 451 may be in the form of a ball, and the valve seat 4434 may be a curved valve seat for mating with the ball of the valve body 451. In another modified embodiment shown in FIG. 14, the valve body 451 may be in the form of a plate.

The piston rod 4432 has a lower rod end 4436 which is disposed outwardly of the outer cylinder 441, and an upper rod end 4431 which is mounted to the piston 443 to permit the piston 443 to slide with the piston rod 4432 such that sliding of the piston rod 4432 is dampened by sliding of the piston 443 in the inner chamber 4420.

In an embodiment shown in FIGS. 6 and 7, the damper device 44 may further include a needle valve unit 46 which is disposed in the upper space 4417, and which includes a needle valve seat 460, a plunger 461, and a sealing ring 462.

The needle valve seat 460 is formed in the upper closed end wall 4423, and defines the vent hole 4421.

The plunger 461 has a needle segment 463 which is tapered downwardly, and a male threaded segment 465 which is opposite to the needle segment 463, and which is configured to be movably and threadedly engaged with the female threaded region 4411 of the first upper dimension segment 4415 such that the needle segment 463 is displaceable relative to the needle valve seat 460 so as to vary a gap between the needle segment 463 and the needle valve seat 460 to thereby adjust a damping force of the damper device 44.

In an embodiment shown in FIGS. 6 and 7, the plunger 461 has a top surface formed with a top setting hole 464 configured to permit the plunger 461 to be driven by a first drive tool (not shown) to rotate relative to the outer cylinder 441 so as to displace the needle segment 463 relative to the needle valve seat 460, to thereby adjust the damping force. The top setting hole 464 may be a hexagonal engaging hole.

The sealing ring 462 is disposed on the plunger 461 between the plunger 461 and the first upper dimension segment 4415 for sealing in the working fluid.

In an embodiment shown in FIGS. 6 and 7, the damper device 44 may further include a sealing mount 446. The sealing mount 446 is fitted in the lower space 4418 beneath the inner cylinder 442 to seal the lower space 4418, and has an inner peripheral surface 4461 which defines a through bore 4460 for passage of the piston rod 4432, and which is configured for permitting the piston rod 4432 to sealingly slide relative to the sealing mount 446.

In an embodiment shown in FIGS. 6 and 7, the damper device 44 may further include a bottom cover 447 which is disposed inside the outer cylinder 441 beneath the sealing mount 446, and which has a through hole 448 for passage of the piston rod 4432. The outer cylinder 441 has a bottom surrounding end segment 4403 with an inward flange 4404 which extends radially and inwardly, and which is disposed outwardly of the bottom cover 447 so as to keep and retain the bottom cover 447 and the sealing mount 446 inside of the outer cylinder 441.

In an embodiment shown in FIGS. 6 to 8, the damper device 44 may further include a second biasing spring 444 disposed between the piston 443 and the upper closed end wall 4423 to bias the piston 443 to the distal position (FIG. 8).

As shown in FIGS. 2, 5, and 12, the first tube 41 extends along the longitudinal axis (X), and includes a first upper segment 413 and a first lower segment 414. The first upper segment 413 is fitted inside the first barrel portion 211 to permit the first tube 4 to turn with the first barrel portion 211 about the longitudinal axis (X), and is configured to permit the damper device 44 to be coupled therein to turn with the first tube 41. The first lower segment 414 is disposed inside the upper barrel segment 222 of the second barrel portion 221 to permit the first tube 41 to turn about the longitudinal axis (X) relative to the second barrel portion 221.

In an embodiment shown in FIGS. 2 and 5, an outer peripheral surface of the first tube 41 is configured to mate with an inner peripheral surface of the first barrel portion 211 to permit the first upper segment 413 of the first tube 41 to be non-rotatably retained in the first barrel portion 211 and to permit the first tube 41 to turn with the first hinge plate 21. In addition, the first barrel portion 211 may have two inner flat surface regions 212 which are diametrically opposite to each other, and the first tube 41 may have two outer flat surface regions 411 for respectively abutting with the inner flat surface regions 212. Alternatively, the first upper segment 413 of the first tube 41 may be secured to the first barrel portion 211 by any fastening members, such as screws or the like.

Figure 9:
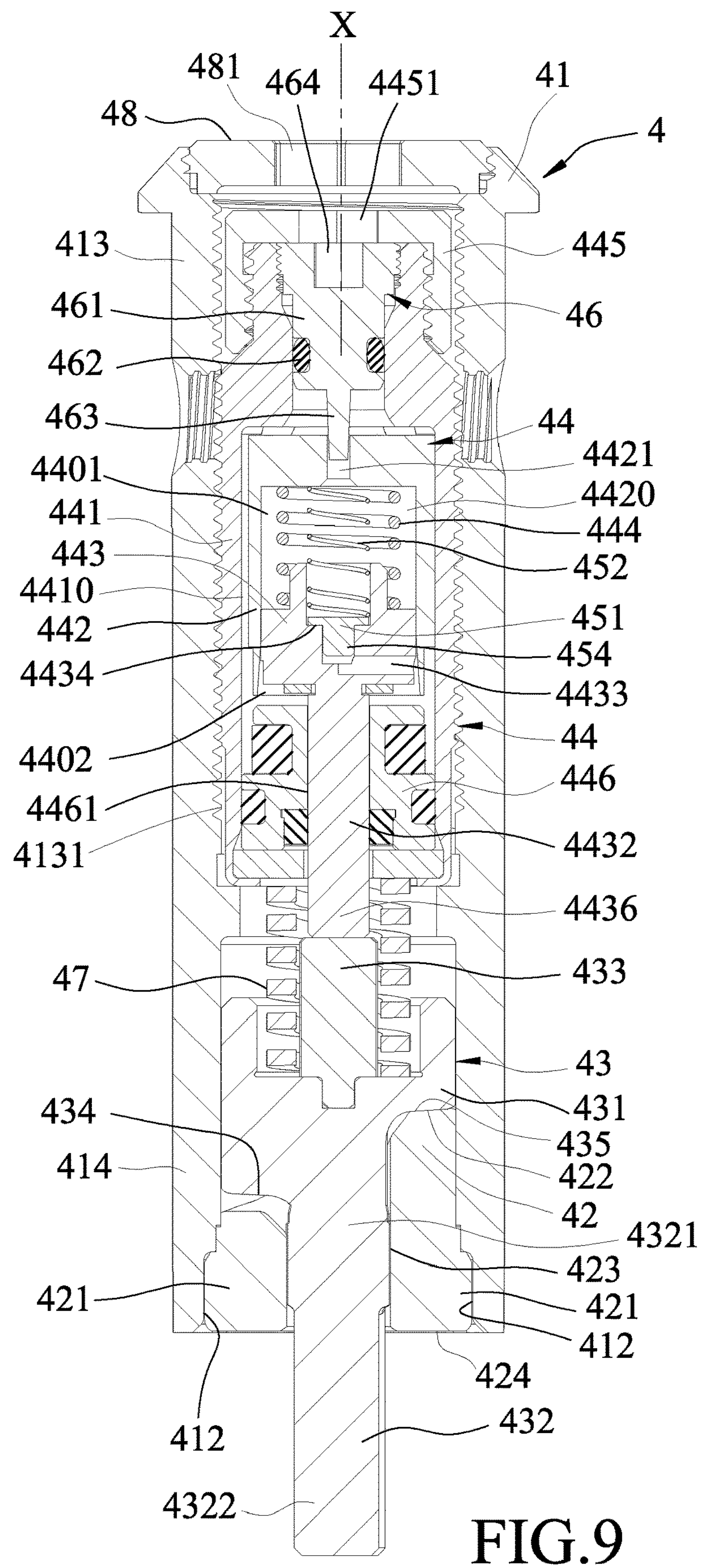
FIG. 9 is a cross-sectional view of the upper tube subassembly illustrating an enlarged head of a slidable shaft in a lower position.

In an embodiment shown in FIGS. 7 and 9, an inner peripheral surface of the first upper segment 413 of the first tube 41 may have a female threaded region 4131 which is configured to be threadedly engaged with the male threaded region 4413 of the outer cylinder 441 so as to permit the damper device 44 to turn with the first tube 41 to thereby turn with the first hinge plate 21.

In an embodiment shown in FIG. 12, a flanged sleeve-like bearing 71 and a bearing sleeve 72 are provided in a space between the first lower segment 414 of the first tube 41 and the upper barrel segment 222 of the second barrel portion 221 to stabilize turning of the first tube 41 relative to the second barrel portion 221.

Figure 10:
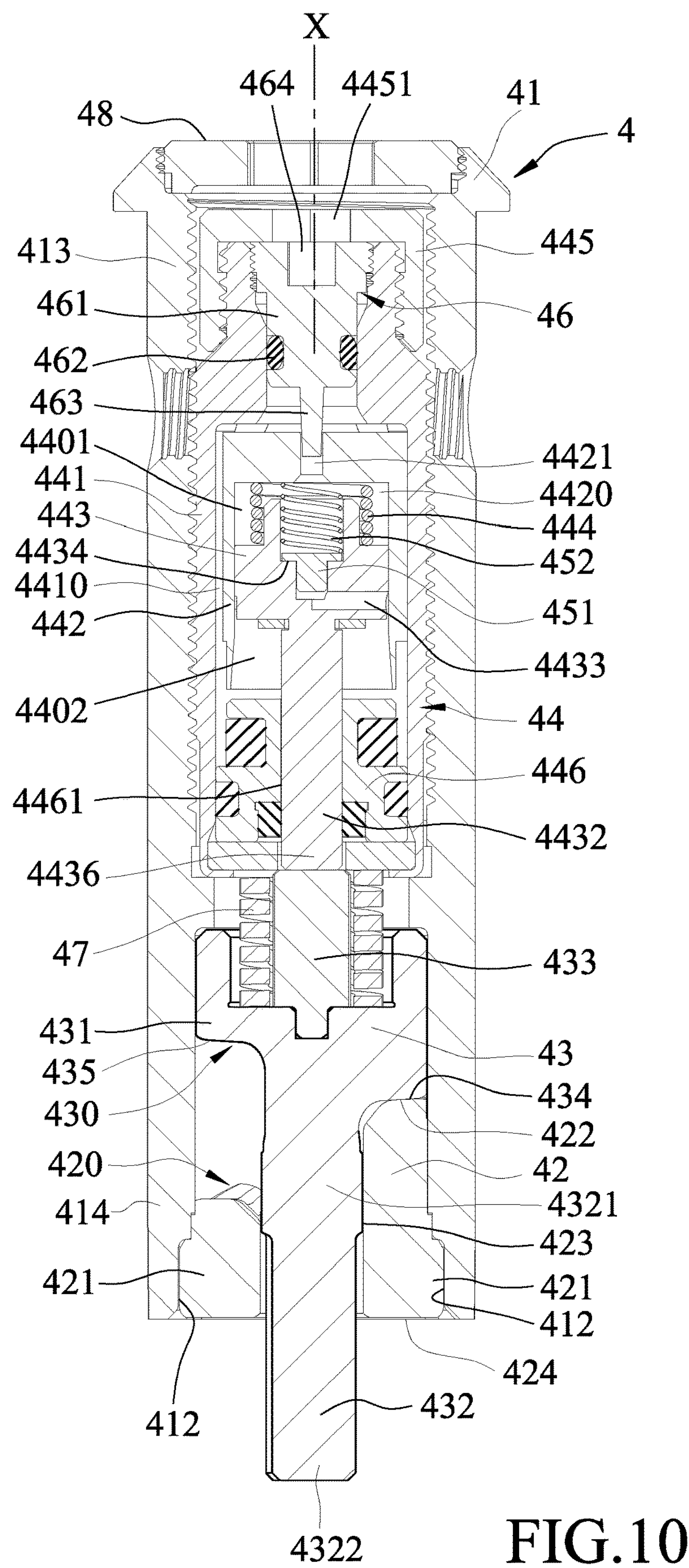
FIG. 10 is similar to FIG. 9 but illustrating the enlarged head in an upper position.

As shown in FIGS. 5, 9, and 10, the guiding stem 42 is fitted inside the first lower segment 414 to turn with the first tube 41, and has a central bore 423 extending along the longitudinal axis (X). The guiding stem 42 has a top camming region 420, and a bottom surface 424 supported on the internal mount 51 (see FIG. 12). In an embodiment shown in FIG. 9, the guiding stem 42 is matingly fitted in a bottom open end of the first tube 41.

In an embodiment shown in FIGS. 5 and 9, an inner peripheral surface of the first lower segment 414 of the first tube 41 is formed with two grooves 412, and the guiding stem 42 is formed with two radial protuberances 421 configured to be respectively fitted in the grooves 412 so as to permit the guiding stems 42 to turn with the first tube 41 to thereby turn with the first hinge plate 21.

As shown in FIG. 12, the internal mount 51 is non-rotatably mounted inside the middle barrel segment 224 of the second barrel portion 221, and has a limiting hole 511 extending along the longitudinal axis (X). In an embodiment shown in FIGS. 2, 11, and 12, the internal mount 51 may be formed with a bottom socket 512, and may secured to the middle barrel segment 224 through a screw 53. Furthermore, the limiting hole 511 may be a square hole.

The slidable shaft 43 extends along the longitudinal axis (X) and includes an enlarged head 431 and a shaft body 432.

The shaft body 432 has an upper end segment 4321 and a lower end segment 4322, and extends through the central bore 423 to be fitted in the limiting hole 511 so as to prevent the slidable shaft 43 from rotating relative to the internal mount 51 and so as to permit the slidable shaft 43 to slide relative to the internal mount 51 and the guiding stem 42 along the longitudinal axis (X). In an embodiment shown in FIG. 5, the shaft body 432 may have a square cross-section.

The enlarged head 431 is fixed on the upper end segment 4321 of the shaft body 432 to permit the shaft body 432 to slide with the enlarged head 431, and is disposed inside the first lower segment 414 of the first tube 41 to be coupled between the guiding stem 42 and the lower rod end 4436 of the piston rod 4432. The enlarged head 431 has a bottom follower region 430 which is engaged by the top camming region 420 such that in response to turning of the first hinge plate 21 from the first position (FIGS. 1 and 12) to the second position (FIG. 11) to cause the guiding stem 42 to turn relative to the enlarged head 431, by virtue of camming action between the top camming region 420 and the bottom follower region 430, the enlarged head 431 is elevated by the guiding stem 42 from a lower position (FIGS. 9 and 12) to an upper position (FIG. 10), resulting in sliding of the piston 443 from the distal position (FIGS. 8 and 9) to the proximate position (FIGS. 7 and 10), to thereby permit the damper device 44 to dampen the turning of the first hinge plate 21.

In an embodiment shown in FIGS. 5, 9, and 10, the top camming region 420 extends inclinedly in a circumferential direction about the longitudinal axis (X) to have a topmost support area 422. The bottom follower region 430 extends inclinedly in the circumferential direction to have a higher area 435 and a lower area 434 such that when the first hinge plate 21 is turned to the first position (FIGS. 1 and 12), the topmost support area 422 is brought into contact with the higher area 435 to thereby support the enlarged head 431 in the lower position (FIGS. 9 and 12), and such that when the first hinge plate 21 is turned to the second position (FIG. 11), the topmost support area 422 is brought into contact with the lower area 434 to thereby support the enlarged head 431 in the upper position (FIG. 10).

In an embodiment shown in FIGS. 5 and 9, the upper tube subassembly 4 may further include an abutment pin 433 which is mounted on the enlarged head 431 to move with the slidable shaft 43, and which is abutted between the enlarged head 431 and the lower rod end 4436 of the piston rod 4432 so as to permit the damper device 44 to dampen the turning of the first hinge plate 21. In detail, when the first hinge plate 21 is turned to the first position (FIGS. 1 and 12), the first tube 41 is turned relative to the slidable shaft 43 to cause upward movement of the slidable shaft 43 and the abutment pin 433. To turn the first hinge plate 21 to the first position to open the door 11, an upward pushing force should be applied to piston rod 4432 against the damping force of the damper device 44 to thereby permit the upward movement of the abutment pin 433.

In an embodiment shown in FIGS. 5 and 9, the upper tube subassembly 4 may further include a third biasing spring 47 disposed between the damper device 44 and the enlarged head 431 to bias the enlarged head 431 to the lower position (FIG. 9). The second and third biasing springs 444, 47 are compressed when the first hinge plate 21 is in the second position (FIGS. 10 and 11). When the first hinge plate 21 is moved toward the first position (FIGS. 1 and 12) to open the door 11, the piston 443 can easily slide to the distal position by virtue of the biasing force of the second biasing spring 444 to allow the working fluid to flow from the lower sub-chamber 4402 to the upper sub-chamber 4401 against the first biasing spring 452. Meanwhile, the enlarged head 431 can easily move to the lower position by virtue of the biasing force of the third biasing spring 47. Therefore, the damping force for the movement of the first hinge plate 21 to the first position is relatively small. Therefore, with the provision of the hinge assembly 2, the damping force for opening the door 11 is smaller than that for closing the door 11. In a not-shown embodiment, other hinge device (s) may be hingedly connected between the door 11 and the door frame 12 for providing a force facilitating the turning of the door 11 to the closed position.

In an embodiment shown in FIGS. 6 and 7, the damper device 44 may further include an end cap 445 which is configured to be movably and threadedly engaged on an upper end of the outer cylinder 441 so as to adjust an axial dimension of the damper device 44. In this case, during the turning of the first hinge plate 21 relative to the second hinge plate 22, a damping range may be adjusted by varying the axial dimension of the damper device 44. The damping range is a range of an included angle defined between the door 11 and the door frame 12 when the first hinge plate 21 is turned against the damping force of the damper device 44, and may range from 30° to 60°. Normally, if the door 11 is opened at an angle greater than 45°, the closing of the door 11 will be dampened by the damper device 44 when the door 11 is released. In the case that the other hinge device(s) are mounted for providing a relatively large closing force to the door 11, the maximum of the damping range may be close to 90°, and may, for example, range from 45° to 80°. When the closing force is relatively small, the minimum of the damping range may be close to 0°, and may, for example, 15° to 45°.

In an embodiment shown in FIGS. 6 and 7, the end cap 445 has a female threaded region 4452 configured to be threadedly engaged with the male threaded region 4414 of the outer cylinder 441, and has an actuated opening 4451 which is configured to be driven by a second drive tool (not shown) to axially displace the end cap 445 relative to the outer cylinder 441, and which is dimensioned to permit access of the first drive tool to the top setting hole 464. In an embodiment, the actuated opening 4451 may be a hexagonal opening.

In an embodiment shown in FIGS. 7 and 8, no sealing ring is provided between the piston 443 and the inner cylinder 442. When the included angle between the first and second leaf portions 210, 220 is less than 20°, the working fluid is permitted to flow through a clearance between the inner cylinder 442 and the piston 443 so as to facilitate the closing of the door 11.

In an embodiment shown in FIGS. 5 and 9, the upper tube subassembly 4 may further include an upper cover 48 which is threadedly secured in an upper open end of the first tube 41 to secure the damper device 44 inside the first tube 41, and which has an access hole 481 disposed to permit access of first and second drive tools to the top setting hole 464 and the actuated opening 4451, respectively.

In an embodiment shown in FIG. 12, the damper device 44 is used for dampening the turning of the first hinge plate 21 relative to the second hinge plate 22. In other not shown embodiments, the damper device 44 may be applied to any apparatus requiring a damping force.

In an embodiment shown in FIGS. 2 and 12, the hinge assembly 2 may further include a lower tube subassembly 3 which includes a second tube 31 extending along the longitudinal axis (X) and including a second upper segment 313 and a second lower segment 314.

The second upper segment 313 is disposed inside the lower barrel segment 223 of the second barrel portion 221 to permit the second tube 31 to turn about the longitudinal axis (X) relative to the second barrel portion 221. The second lower segment 314 is fitted inside the third barrel portion 213 to permit the second tube 31 to turn with the third barrel portion 213 about the longitudinal axis (X) to thereby turn with the first hinge plate 21.

In an embodiment shown in FIG. 12, a flanged sleeve-like bearing 73 and a bearing sleeve 74 are provided in a space between the second upper segment 313 of the second tube 31 and the lower barrel segment 223 of the second barrel portion 221 to stabilize turning of the second tube 31 relative to the second barrel portion 221.

Figure 3:
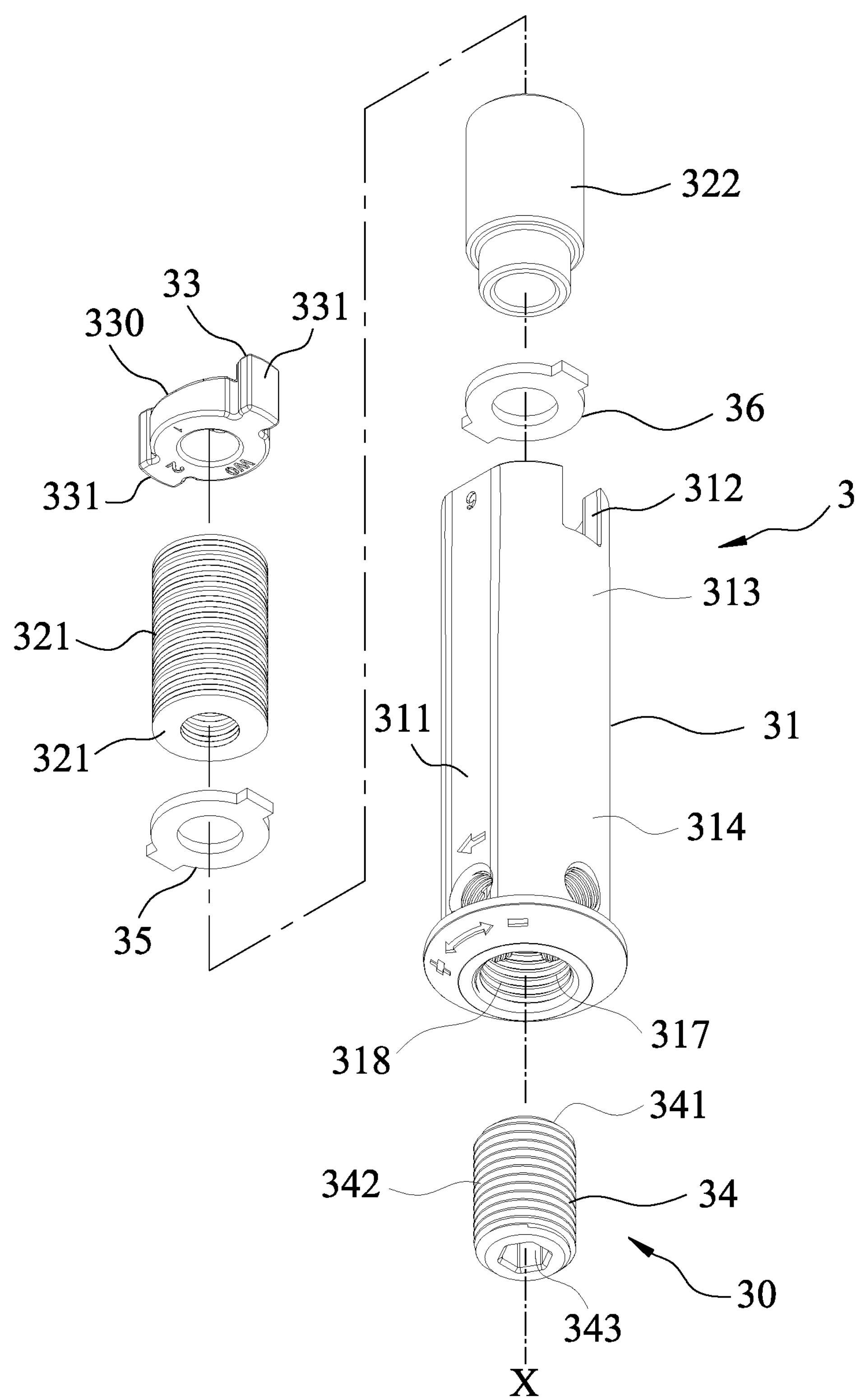
FIG. 3 is an exploded perspective view of a lower tube subassembly of the hinge assembly of FIG. 1.

In an embodiment shown in FIGS. 2 and 3, an outer peripheral surface of the second tube 31 is configured to mate with an inner peripheral surface of the third barrel portion 213 to permit the second lower segment 314 of the second tube 31 to be non-rotatably retained in the third barrel portion 213 and to permit the second tube 31 to turn with the first hinge plate 21. In addition, the third barrel portion 213 may have two inner flat surface regions 214 which are diametrically opposite to each other, and the second tube 31 may have two outer flat surface regions 311 for respectively abutting with the inner flat surface regions 214. Alternatively, the second lower segment 314 of the second tube 31 may be secured to the third barrel portion 213 by any fastening members, such as screws or the like.

In an embodiment shown in FIGS. 2 and 12, the internal unit 5 may further include a contact mount 52 disposed beneath the internal mount 51 and non-rotatably coupled to the second barrel portion 221 through the internal mount 51. The contact mount 52 has a lower contact protuberance 521.

In an embodiment shown in FIGS. 2 and 12, the contact mount 52 may have an upper profile configured to be plugged into the bottom socket 512 so as to permit the contact mount 52 to be non-rotatably coupled to the second barrel portion 221. Furthermore, the contact mount 52 may have a central hole 522 configured to permit sliding of the slidable shaft 43 relative to the contact mount 52.

Figure 4:
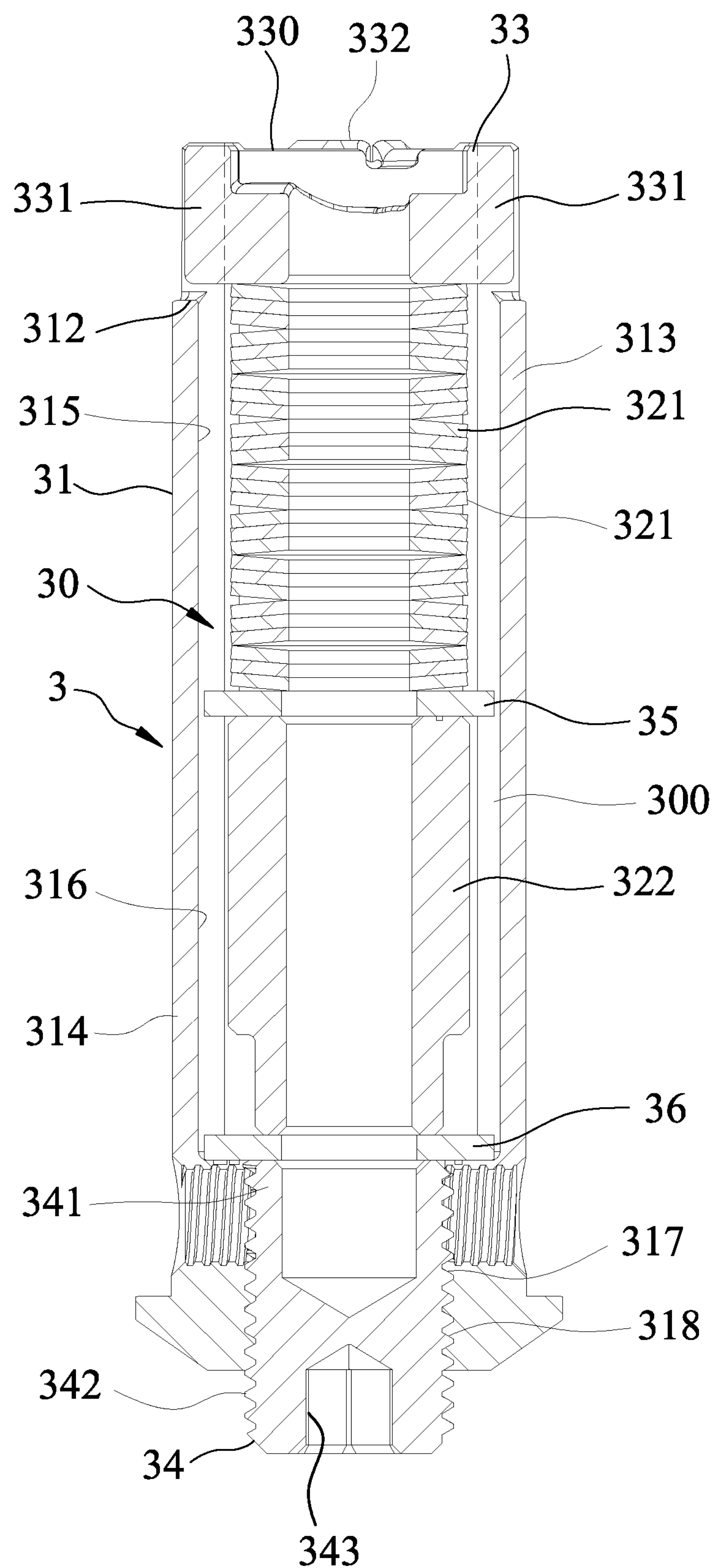
FIG. 4 is a cross-sectional view of the lower tube subassembly.

In an embodiment shown in FIGS. 3, 4, and 12, the lower tube subassembly 3 may further include an abutment block 33. The abutment block 33 is retained by an upper end of the second upper segment 313 of the second tube 31 to turn with the second tube 31, and has an upper curved surface 330 with an upper contact region 332 configured such that in response to the turning of the first hinge plate 21 from the second position (FIG. 11) to the first position (FIGS. 1 and 12), the abutment block 33 is turned with the second tube 31 to bring the upper contact region 332 into frictional engagement with the lower contact protuberance 521 so as to temporarily keep the first hinge plate 21 in the first position.

In one embodiment, in the first position, the first and second leaf portions 210, 220 may have the first included angle set at 800 or 90°. When the first hinge plate 21 is moved to the first position (FIGS. 1 and 12), the first hinge plate 21 may be temporarily kept at the first position by virtue of a frictional force produced between the upper contact region 332 and the lower contact protuberance 521. When the door 11 is pulled or pushed to overcome the frictional force, the first hinge plate 21 may be moved away from the first position. To reduce the closing speed of the door 11 toward the door frame 12, the first included angle may be set below 200 or set in a range from 20° to 60°. Alternatively, based on user requirements, the first included angle in the first position may be set in a range from −80° to 180°.

In an embodiment shown in FIGS. 4 and 12, the upper curved surface 330 may be a ramp-up surface, the upper contact region 332 being the topmost region of the ramp-up surface 330. During the turning of the first hinge plate 21 from the second position (FIG. 11) to the first position (FIGS. 1 and 12), the frictional force between the ramp-up surface 330 and the lower contact protuberance 521 may be gradually increased. Therefore, the opening of the door 11 may be retarded by the gradually increased frictional force.

In an embodiment shown in FIGS. 3 and 4, the upper end of the second upper segment 313 of the second tube 31 is formed with two slots 312, and the abutment block 33 is formed with two radial projections 331 which are configured to be respectively retained in the slots 312 so as to permit the abutment block 33 to be retained by and turned with the second tube 31, to thereby turn with the first hinge plate 21.

In an embodiment shown in FIG. 4, the second tube 31 has an inner peripheral surface 315 including a second upper dimension segment 316 and a second lower dimension segment 317 which is smaller than the second upper dimension segment 316, and which has an inner threaded region 318.

In an embodiment shown in FIGS. 3 and 4, the lower tube subassembly 3 may further include an adjusting unit 30 which is disposed inside the second tube 31, and which includes a set of washer springs 321, a force-transmission block 322, and a force adjusting stem 34.

The set of washer springs 321 are disposed inside an internal chamber 300 defined by the second upper dimension segment 316 of the second tube 31, and are disposed beneath the abutment block 33 to bias the abutment block 33 upwardly.

The force-transmission block 322 is disposed inside the internal chamber 300 beneath the set of washer springs 321. In an embodiment shown in FIG. 3, the force-transmission block 322 may be in the form of a sleeve.

The force adjusting stem 34 has an upper end 341 and an outer threaded surface 342. The upper end 341 is coupled to the abutment block 33 via the force-transmission block 322 and the set of washer springs 321. The outer threaded surface 342 is configured to be movably and threadedly engaged with the inner threaded region 318 of the second tube 31 so as to adjust the frictional force between the upper contact region 332 of the abutment block 33 and the lower contact protuberance 521 of the contact mount 52 when the first hinge plate 21 is moved to the first position (FIGS. 1 and 12).

In an embodiment shown in FIGS. 3 and 4, the force adjusting stem 34 has a bottom setting hole 343 configured to permit the force adjusting stem 34 to be driven to rotate by a third drive tool (not shown) so as to displace the force adjusting stem 34 relative to the second tube 31, to thereby adjust the frictional force when the first hinge plate 21 is moved to the first position. The bottom setting hole 343 may be a hexagonal engaging hole.

In an embodiment shown in FIGS. 3 and 4, the lower tube subassembly 3 may further include two washer rings 35, 36. The washer ring 35 is disposed between the bottommost one of the spring washers 321 and the force-transmission block 322, and the washer ring 36 is disposed between the force-transmission block 322 and the force adjusting stem 34.

In an embodiment, the first and second hinge plates 21, 22 are respectively mounted to the door 11 and the door frame 12, and the first hinge plate 21 is turned relative to the second hinge plate 22. In other embodiment, the first and second hinge plates 21, 22 may be respectively mounted to the door frame 12 and the door 11, and the second hinge plate 22 is turned relative to the first hinge plate 21.

FIGS. 15 to 18 illustrate a hinge assembly according to a second embodiment of the disclosure. The second embodiment is similar to the first embodiment, except that in the second embodiment, a lower tube subassembly 6 replaces the lower tube subassembly 3 of the first embodiment.

The lower tube subassembly 6 includes a second tube 61, a torsion spring 62, an adjusting base 63, and a plug shaft 66.

The second tube 61 extends along the longitudinal axis (X), and includes a second upper segment 613 and a second lower segment 614. The second upper segment 613 is disposed inside the lower barrel segment 223 of the second barrel portion 221 to permit the second tube 61 to turn about the longitudinal axis (X) relative to the second barrel portion 221. The second lower segment 614 is fitted inside the third barrel portion 213 to permit the second tube 61 to turn with the third barrel portion 213 about the longitudinal axis (X) to thereby turn with the first hinge plate 21.

Figure 15:
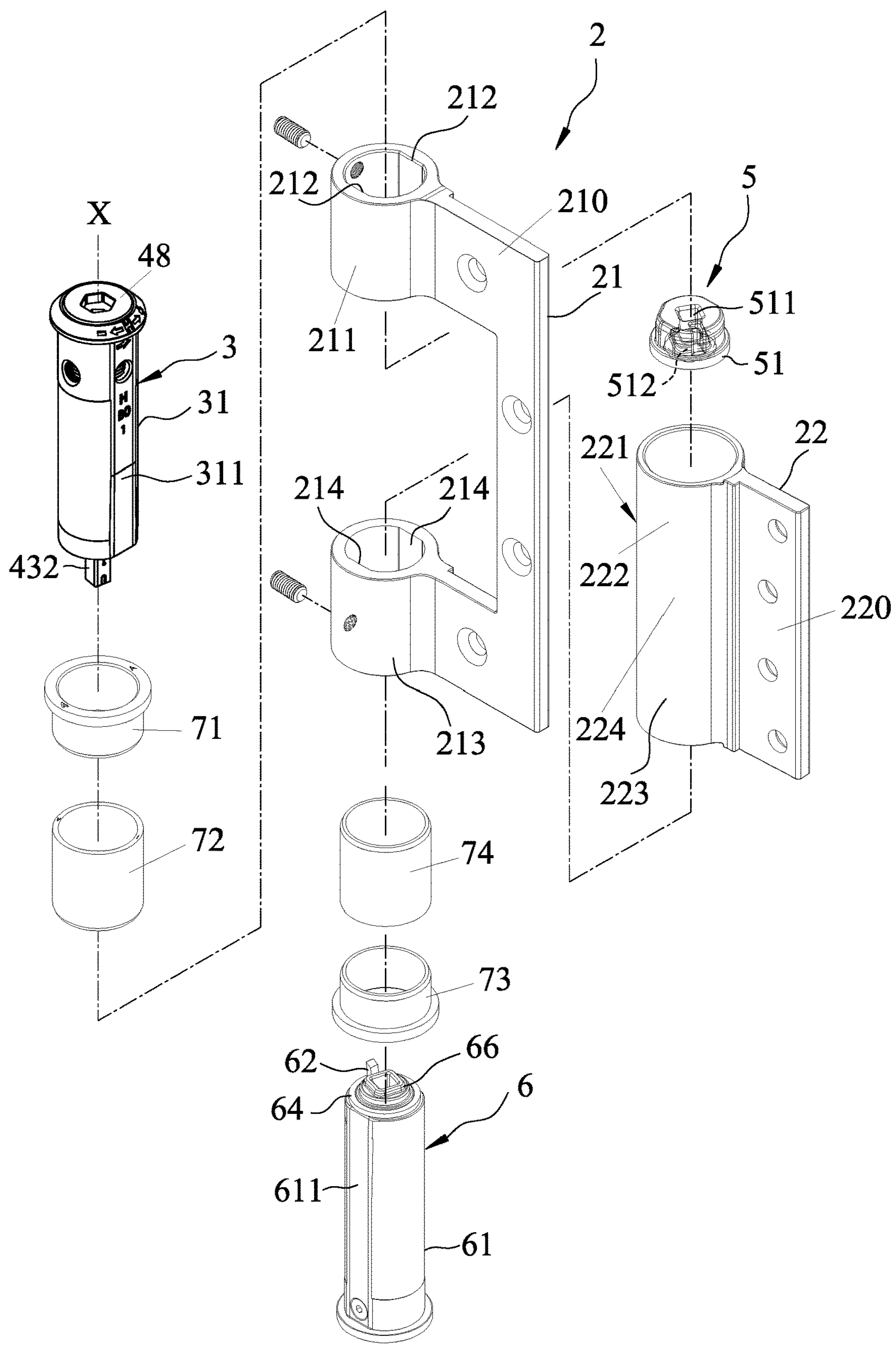
FIG. 15 is a partially exploded perspective view of a hinge assembly according to a second embodiment of the disclosure.
Figure 18:
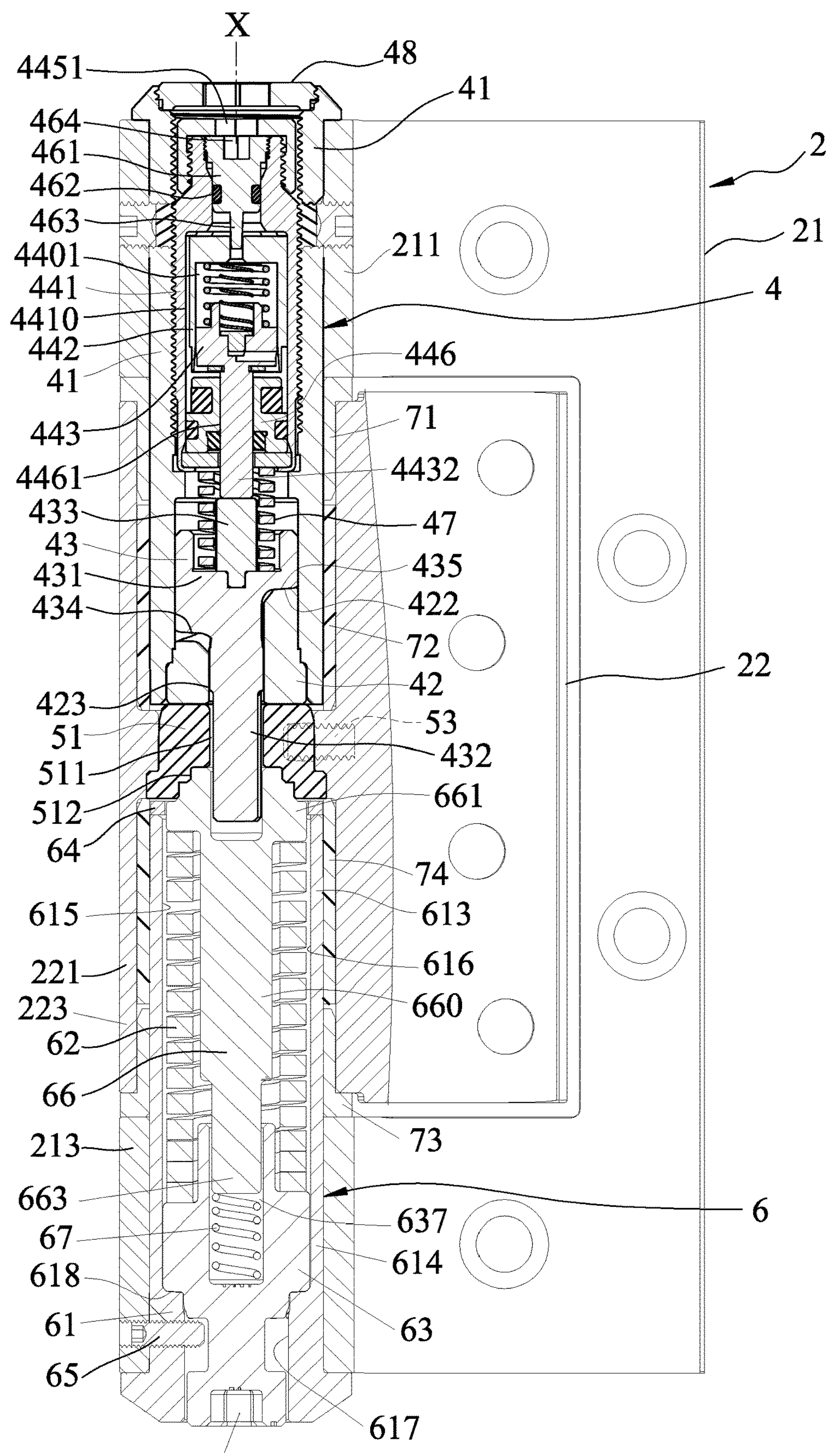
FIG. 18 is a cross-sectional view of the hinge assembly of the second embodiment in an assembled state.

In an embodiment shown in FIGS. 15 and 18, a flanged sleeve-like bearing 73 and a bearing sleeve 74 are provided in a space between the second upper segment 613 of the second tube 61 and the lower barrel segment 223 of the second barrel portion 221 to stabilize turning of the second tube 61 relative to the second barrel portion 221.

In an embodiment shown in FIGS. 15 and 18, an outer peripheral surface of the second tube 61 is configured to mate with an inner peripheral surface of the third barrel portion 213 to permit the second lower segment 614 of the second tube 61 to be non-rotatably retained in the third barrel portion 213 and to permit the second tube 61 to turn with the first hinge plate 21. In addition, the second tube 61 may have two outer flat surface regions 611 for respectively abutting with the inner flat surface regions 214. Alternatively, the second lower segment 614 of the second tube 61 may be secured to the third barrel portion 213 by any fastening members, such as screws or the like.

Figure 17:
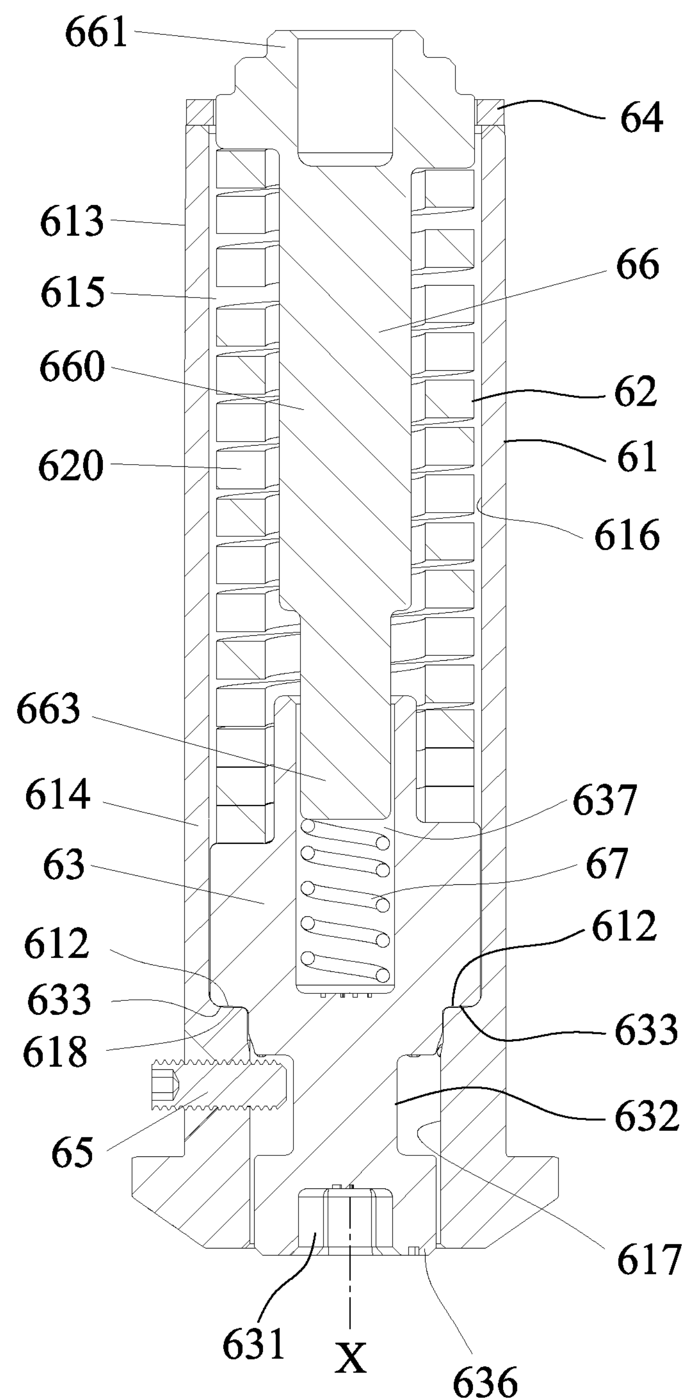
FIG. 17 is a cross-sectional view of the lower tube subassembly of FIG. 16 in an assembled state.

In an embodiment shown in FIGS. 17 and 18, the second tube 61 has an inner peripheral surface 615 including a second upper dimension segment 616 and a second lower dimension segment 617 which is smaller than the second upper dimension segment 616 so that the inner peripheral surface 615 further includes a juncture region 618 between the second upper and lower dimension segments 616, 617. The juncture region 618 is formed with a plurality of upward teeth 612 angularly displaced from each other about the longitudinal axis (X).

The plug shaft 66 has an upper plug head 661 and an elongated shaft 660. The upper plug head 661 is configured to be plugged into the bottom socket 512 so as to permit the plug rod 66 to be non-rotatably coupled to the second barrel portion 221 through the internal mount 51. The elongated shaft 660 extends downwardly from the upper plug head 661 along the longitudinal axis (X) to terminate at a lower shaft end 663.

The adjusting base 63 is disposed inside the second lower segment 614 and has an upper bearing recess 637 and an outer peripheral surface 630. The upper bearing recess 637 is configured for receiving the lower shaft end 663 of the plug shaft 66 so as to permit the adjusting base 63 to turn relative to the plug shaft 66 about the longitudinal axis (X). The outer peripheral surface 630 surrounds the longitudinal axis (X), and has an engaging portion 635 formed with a plurality of downward teeth 633 which are angularly displaced from each other about the longitudinal axis (X), and which are configured to mesh with the upward teeth 612 so as to permit the adjusting base 63 to turn with the second tube 61.

Figure 16:
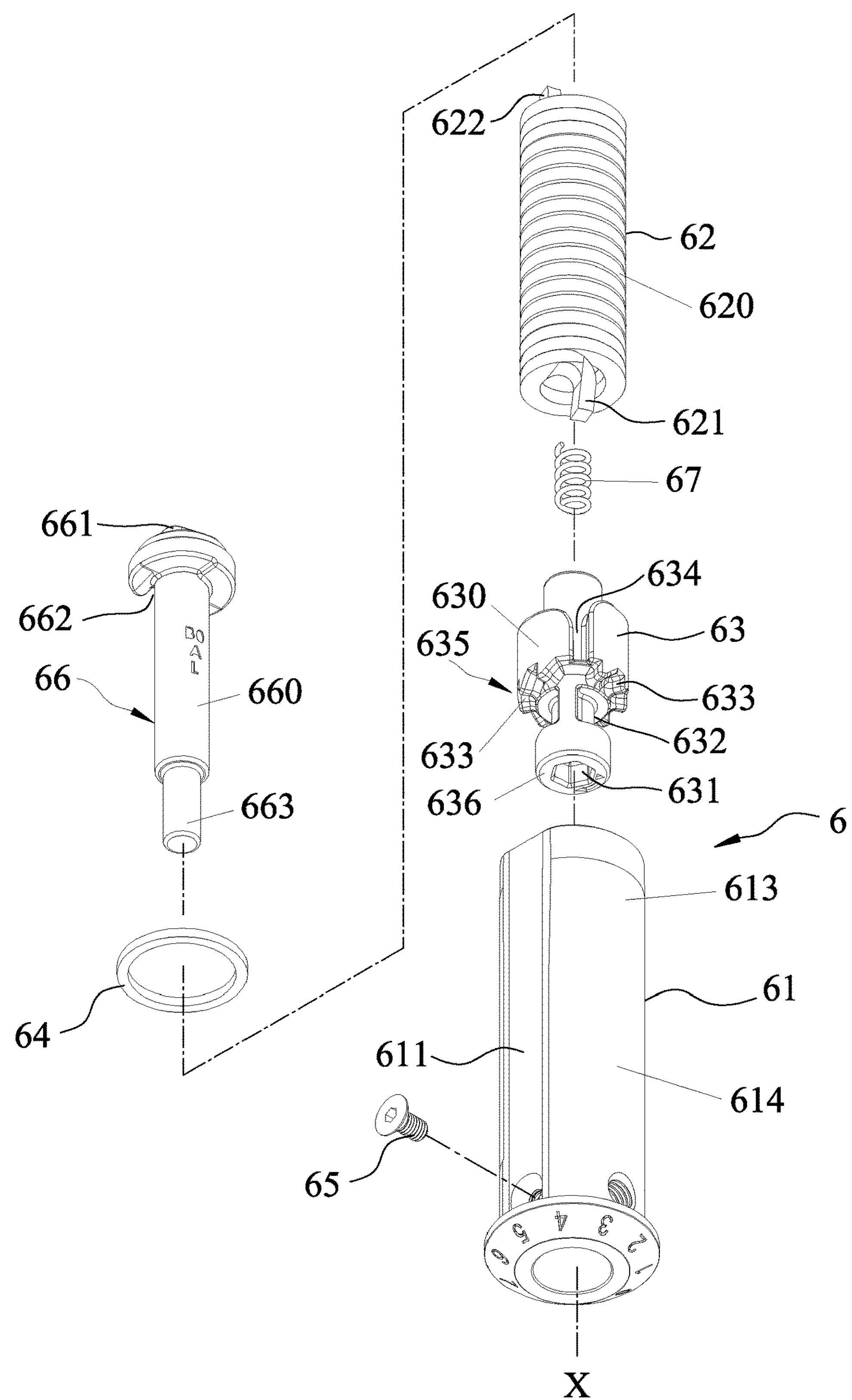
FIG. 16 is an exploded perspective view of a lower tube subassembly of the hinge assembly of FIG. 15.

In an embodiment shown in FIGS. 16 to 18, the lower tube subassembly 6 may further include a fourth biasing spring 67 which is disposed in the upper bearing recess 637 of the adjusting base 63 so as to bias the upper plug head 661 into plugging engagement with the bottom socket 512 of the internal mount 51.

The torsion spring 62 has a coil spring body 620 which is sleeved on the elongated shaft 660, and two spring ends 621, 622 which are respectively retained by the adjusting base 63 and the upper plug head 661 such that when the first hinge plate 21 is turned to the first position (FIGS. 1 and 18) from the second position (FIG. 11), the second tube 61 is turned with the first hinge plate 21 against the torsion spring 62 to thereby retard the turning of the first hinge plate 21 to the first position. In this case, the torsion spring 62 provides a biasing force for closing the door 11.

In an embodiment shown in FIG. 16, the adjusting base 63 has a slit 634 for retaining therein the spring end 621, and the upper plug head 661 has a slit 662 for retaining therein the spring end 622.

In an embodiment shown in FIGS. 16 to 18, the adjusting base 63 has a bottom surface 636 formed with a base setting hole 631 which is exposed from a bottom open end of the second tube 61, and which is configured to permit the adjusting base 63 to be driven by a fourth drive tool (not shown) to rotate relative to the second tube 61 so as to set the adjusting base 63 in a selected angular position relative to the second tube 61, thereby adjusting a retarding force during the turning of the first hinge plate 21 to the first position (FIGS. 1 and 18). The base setting hole 631 may be a hexagonal engaging hole. By rotating the adjusting base 63 relative to the second tube 61, the torsion spring 62 may be tightened or loosened to adjust the retarding force.

In an embodiment shown in FIGS. 16 and 17, the adjusting base 63 has a neck portion 632 disposed between the engaging portion 635 and the bottom surface 636 of the adjusting base 63. The lower tube subassembly 6 may further include a positioning pin 65 which extends through the second lower segment 614 of the second tube 61 to position the neck portion 632 so as to retain the adjusting base 63 inside the second lower segment 614 of the second tube 61.

In an embodiment shown in FIGS. 16 and 18, the lower tube subassembly 6 may further include a washer ring 64 disposed between the internal mount 51 and the second tube 61.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A damper device comprising:

an outer cylinder extending along a longitudinal axis;

an inner cylinder which is disposed inside said outer cylinder to define a clearance between said inner and outer cylinders, and which defines therein an inner chamber for accommodation of a working fluid, said inner cylinder having a lower open end and an upper closed end wall formed with a vent hole;

a piston disposed in said inner chamber to divide said inner chamber into an upper sub-chamber, which is in fluid communication with said clearance through said vent hole, and a lower sub-chamber, which is in fluid communication with said clearance through said lower open end, said piston having a passageway for fluid communication between said upper and lower sub-chambers, and being slidable between a distal position and a proximate position relative to said upper closed end wall;

a check valve coupled to said passageway in a manner to permit a unidirectional flow of the working fluid from said lower sub-chamber to said upper sub-chamber such that when said piston slides toward the distal position, the working fluid is permitted to flow from said lower sub-chamber to said upper sub-chamber through said passageway, and such that when said piston slides toward the proximate position, the working fluid in said upper sub-chamber is forced to flow to said lower sub-chamber through said vent hole, said clearance, and said lower open end; and a piston rod having a lower rod end which is disposed outwardly of said outer cylinder, and an upper rod end which is mounted to said piston to permit said piston to slide with said piston rod such that sliding of the piston rod is dampened by sliding of said piston in said inner chamber, wherein said check valve includes a valve body, a valve seat formed on an upper side of said piston, and defining a valve hole in fluid communication with said passageway, said valve seat having a contour corresponding to a shape of said valve body, and a first biasing spring disposed between said valve body and said upper closed end wall to bias said valve body to couple on said valve seat so as to ensure the unidirectional flow of the working fluid from said lower sub-chamber to said upper sub-chamber.

2. The damper device of claim 1, wherein said valve body has a stem portion for insertion into said valve hole, and a flange portion extending radially from an upper end of said stem portion for resting on said valve seat.

3. The damper device of claim 1, wherein said valve body is in the form of a ball.

4. The damper device of claim 1, wherein said outer cylinder has an inner peripheral surface including a first upper dimension segment which defines an upper space, and which has a female threaded region, and a first lower dimension segment which is larger than said first upper dimension segment, and which defines a lower space for accommodation of said inner cylinder, said damper device further comprising a needle valve unit which is disposed in said upper space, and which includes a needle valve seat formed in said upper closed end wall, and defining said vent hole, a plunger having a needle segment and a male threaded segment which is opposite to said needle segment, and which is configured to be movably and threadedly engaged with said female threaded region of said first upper dimension segment such that said needle segment is displaceable relative to said needle valve seat so as to vary a gap between said needle segment and said needle valve seat to thereby adjust a damping force of said damper device, and a sealing ring disposed on said plunger between said plunger and said first upper dimension segment for sealing in the working fluid.

5. The damper device of claim 4, wherein said plunger has a top surface formed with a top setting hole configured to permit said plunger to be driven to rotate relative to said outer cylinder so as to displace the needle segment relative to said needle valve seat, to thereby adjust the damping force, said damper device further comprising a sealing mount fitted in said lower space beneath said inner cylinder to seal said lower space, and having an inner peripheral surface which defines a through bore for passage of said piston rod, and which is configured for permitting said piston rod to sealingly slide relative to said sealing mount.

6. The damper device of claim 5, further comprising a bottom cover which is disposed inside said outer cylinder beneath said sealing mount, and which has a through hole for passage of said piston rod, said outer cylinder having a bottom surrounding end segment with an inward flange which extends radially and inwardly, and which is disposed outwardly of said bottom cover so as to keep and retain said bottom cover and said sealing mount inside of said outer cylinder.

7. A hinge assembly for hingedly connecting a first element to a second element, said hinge assembly comprising:

said damper device of claim 1;

a first hinge plate including a first leaf portion for being mounted to the first element, and a first barrel portion;

a second hinge plate including a second leaf portion for being mounted to the second element, and a second barrel portion which has an upper barrel segment, a lower barrel segment, and a middle barrel segment between said upper and lower barrel segments, and which is disposed beneath and coupled to said first barrel portion such that said first hinge plate is turnable relative to said second hinge plate between a first position, where said first and second leaf portions define therebetween a first included angle, and a second position, where said first and second leaf portions define therebetween a second included angle smaller than the first included angle;

a first tube extending along the longitudinal axis, and including a first upper segment which is fitted inside said first barrel portion to permit said first tube to turn with said first barrel portion about the longitudinal axis, and which is configured to permit said damper device to be coupled therein to turn with said first tube, and a first lower segment which is disposed inside said upper barrel segment of said second barrel portion to permit said first tube to turn about the longitudinal axis relative to said second barrel portion;

a guiding stem which is fitted inside said first lower segment to turn with said first tube, and which has a central bore extending along the longitudinal axis, said guiding stem having a top camming region;

an internal mount which is non-rotatably mounted inside said middle barrel segment of said second barrel portion, and which has a limiting hole extending along the longitudinal axis; and a slidable shaft extending along the longitudinal axis and including a shaft body having an upper end segment and a lower end segment, and extending through said central bore to be fitted in said limiting hole so as to prevent said slidable shaft from rotating relative to said internal mount and so as to permit said slidable shaft to slide relative to said internal mount and said guiding stem along the longitudinal axis, and an enlarged head which is fixed on said upper end segment of said shaft body to permit said shaft body to slide with said enlarged head, and which is disposed inside said first lower segment of said first tube to be coupled between said guiding stem and said lower rod end of said piston rod, said enlarged head having a bottom follower region which is engaged by said top camming region such that in response to turning of said first hinge plate from the first position to the second position to cause said guiding stem to turn relative to said enlarged head, by virtue of camming action between said top camming region and said bottom follower region, said enlarged head is elevated by said guiding stem from a lower position to an upper position, resulting in sliding of said piston from the distal position to the proximate position, to thereby permit said damper device to dampen the turning of said first hinge plate.

8. The hinge assembly of claim 7, wherein said top camming region extends inclinedly in a circumferential direction about the longitudinal axis to have a topmost support area; and said bottom follower region extends inclinedly in the circumferential direction to have a higher area and a lower area such that when said first hinge plate is turned to the first position, said topmost support area is brought into contact with said higher area to thereby support said enlarged head in the lower position, and such that when said first hinge plate is turned to the second position, said topmost support area is brought into contact with said lower area to thereby support said enlarged head in the upper position, said hinge assembly further comprising an abutment pin mounted on said enlarged head to move with said slidable shaft, and abutted between said enlarged head and said lower rod end of said piston rod so as to permit said damper device to dampen the turning of said first hinge plate.

9. The hinge assembly of claim 7, wherein said damper device further includes a second biasing spring disposed between said piston and said upper closed end wall to bias said piston to the distal position.

10. The hinge assembly of claim 7, further comprising a third biasing spring disposed between said damper device and said enlarged head to bias said enlarged head to the lower position.

11. The hinge assembly of claim 7, wherein said damper device further includes an end cap which is configured to be movably and threadedly engaged on an upper end of said outer cylinder so as to adjust an axial dimension of said damper device.

12. The hinge assembly of claim 7, wherein said first hinge plate further includes a third barrel portion, said first and third barrel portions being coupled to two opposite sides of said second barrel portion to turn relative to said second barrel portion about the longitudinal axis, said hinge assembly further comprising:

a second tube extending along the longitudinal axis, and including a second upper segment which is disposed inside said lower barrel segment of said second barrel portion to permit said second tube to turn about the longitudinal axis relative to said second barrel portion, and a second lower segment which is fitted inside said third barrel portion to permit said second tube to turn with said third barrel portion about the longitudinal axis.

13. The hinge assembly of claim 12, further comprising:

a contact mount disposed beneath said internal mount and non-rotatably coupled to said second barrel portion through said internal mount, said contact mount having a lower contact protuberance; and an abutment block which is retained by an upper end of said second upper segment of said second tube to turn with said second tube, and which has an upper contact region configured such that in response to the turning of said first hinge plate from the second position to the first position, said abutment block is turned with said second tube to bring said upper contact region into frictional engagement with said lower contact protuberance so as to temporarily keep said first hinge plate in the first position.

14. The hinge assembly of claim 13, wherein said second tube has an inner peripheral surface including a second upper dimension segment and a second lower dimension segment which is smaller than said second upper dimension segment, and which has an inner threaded region, said hinge assembly further comprising an adjusting unit which is disposed inside said second tube, and which includes a set of washer springs which are disposed inside an internal chamber defined by said second upper dimension segment of said second tube, and which are disposed beneath said abutment block to bias said abutment block upwardly, a force-transmission block disposed inside said internal chamber beneath said set of washer springs, and a force adjusting stem having an upper end coupled to said abutment block via said force-transmission block and said set of washer springs, and an outer threaded surface which is configured to be movably and threadedly engaged with said inner threaded region of said second tube so as to adjust a frictional force between said upper contact region of said abutment block and said lower contact protuberance of said contact mount when said first hinge plate is moved to the first position.

15. The hinge assembly of claim 14, wherein said force adjusting stem has a bottom setting hole configured to permit said force adjusting stem to be driven to rotate so as to displace said force adjusting stem relative to said second tube, to thereby adjust the frictional force.

16. The hinge assembly of claim 12, wherein said second tube has an inner peripheral surface including a second upper dimension segment and a second lower dimension segment which is smaller than said second upper dimension segment so that said inner peripheral surface further includes a juncture region between said second upper and lower dimension segments, said juncture region being formed with a plurality of upward teeth angularly displaced from each other about the longitudinal axis, said internal mount being formed with a bottom socket, said hinge assembly further comprising:

a plug shaft having an upper plug head configured to be plugged into said bottom socket so as to permit said plug rod to be non-rotatably coupled to said second barrel portion through said internal mount, and an elongated shaft extending downwardly from said upper plug head along the longitudinal axis to terminate at a lower shaft end;

an adjusting base disposed inside said second lower segment and having an upper bearing recess configured for receiving said lower shaft end of said plug shaft so as to permit said adjusting base to turn relative to said plug shaft about the longitudinal axis, and an outer peripheral surface having an engaging portion formed with a plurality of downward teeth which are angularly displaced from each other about the longitudinal axis, and which are configured to mesh with said upward teeth so as to permit said adjusting base to turn with said second tube; and a torsion spring having a coil spring body which is sleeved on said elongated shaft, and two spring ends which are respectively retained by said adjusting base and said upper plug head such that when said first hinge plate is turned to the first position from the second position, said second tube is turned with said first hinge plate against said torsion spring to thereby retard turning of said first hinge plate to the first position.

17. The hinge assembly of claim 16, wherein said adjusting base has a bottom surface formed with a base setting hole which is exposed from a bottom open end of said second tube, and which is configured to permit said adjusting base to be driven to rotate relative to said second tube so as to set said adjusting base in a selected angular position relative to said second tube, thereby adjusting a retarding force during the turning of said first hinge plate to the first position.

18. The hinge assembly of claim 17, wherein said adjusting base has a neck portion disposed between said engaging portion and said bottom surface of said adjusting base, said hinge assembly further comprising a positioning pin which extends through said second lower segment of said second tube to position said neck portion so as to retain said adjusting base inside said second lower segment of said second tube.

19. The hinge assembly of claim 16, further comprising a fourth biasing spring which is disposed in said upper bearing recess of said adjusting base to bias said upper plug head into plugging engagement with said bottom socket of said internal mount.

* * * * *